(12) United States Patent
Frozenfar

(10) Patent No.: US 10,361,781 B1
(45) Date of Patent: Jul. 23, 2019

(54) APPARATUS FOR DIGITAL AGGREGATION OF UPSTREAM TRAFFIC

(71) Applicant: Sealight Technologies, Inc., Santa Clara, CA (US)

(72) Inventor: Moshe Frozenfar, Palo Alto, CA (US)

(73) Assignee: SEALIGHT TECHNOLOGIES, INC., Santa Clara, CA (US)

(*) Notice: Subject to any disclaimer, the term of this patent is extended or adjusted under 35 U.S.C. 154(b) by 0 days.

(21) Appl. No.: 15/894,645

(22) Filed: Feb. 12, 2018

Related U.S. Application Data

(60) Provisional application No. 62/458,450, filed on Feb. 13, 2017.

(51) Int. Cl.
*H04B 10/2575* (2013.01)
*H04J 14/02* (2006.01)

(52) U.S. Cl.
CPC ........ *H04B 10/25751* (2013.01); *H04J 14/02* (2013.01)

(58) Field of Classification Search
None
See application file for complete search history.

(56) References Cited

U.S. PATENT DOCUMENTS

| | | | | |
|---|---|---|---|---|
| 6,490,727 B1* | 12/2002 | Nazarathy | ........... | H04J 14/0226 348/E7.071 |
| 6,760,550 B2 | 7/2004 | Sucharczuk et al. | | |
| 2002/0129379 A1* | 9/2002 | Levinson | ........... | H04N 7/17309 725/129 |
| 2003/0077038 A1* | 4/2003 | Murashima | ........ | G02B 6/02085 385/37 |
| 2014/0270774 A1* | 9/2014 | Dai | .................... | H04Q 11/0067 398/67 |
| 2016/0149610 A1* | 5/2016 | Maki | .................... | H04J 3/0644 398/115 |

* cited by examiner

*Primary Examiner* — Kenneth N Vanderpuye
*Assistant Examiner* — David W Lambert
(74) *Attorney, Agent, or Firm* — North Shore Patents, P.C.; Michele Liu Baillie

(57) ABSTRACT

A system for digital aggregation of upstream traffic in a network includes optical nodes coupled to a customer distribution network. Dedicated optical fiber spans are coupled to the optical nodes, where each optical node is assigned a dedicated optical fiber span. An upstream aggregator is coupled to each of dedicated optical fiber spans. The upstream aggregator receives digital data from each optical node over each dedicated optical fiber spans assigned to the optical nodes, aggregates the digital data received from each optical node, and outputs the aggregated digital data. The system further includes a digital receiver coupled to the upstream aggregator. The digital receiver receives the aggregated digital data from the upstream aggregator, processes the aggregated digital data; and outputs the processed aggregated digital data to the network.

12 Claims, 26 Drawing Sheets

APPARATUS FOR DIGITAL AGGREGATION OF UPSTREAM TRAFFIC

BACKGROUND OF THE INVENTION

Cable television (TV) systems utilize an architecture called Hybrid Fiber Coax (HFC), as illustrated in FIG. 1. The HFC architecture relies on a mixture of fiber optic technology and coaxial cable-based transmission technology. The cable TV system is comprised of a central facility called a head-end office 1, where central equipment controlling much of the cable system resides, optical node 6, coaxial (coax) distribution network 7, and equipment at customer premises 8. The head-end office 1 can serve a very large number of customers, often an entire city or a metro area. The head-end office 1 uses fiber optic cables to cover long distances between its location and optical node locations. Fiber optic medium is well suited for this portion of the network due to its ability to propagate optical signals across long distances with small signal power losses. The coax portion of the network generally covers short distances due to its relatively high signal power losses. A network of radio frequency (RF) power amplifiers is used to boost the RF signals power along the coax distribution network 7 to provide uniform RF power levels across the covered area. HFC coaxial distribution network is a shared medium that is used simultaneously to carry both the upstream and the downstream signals by employing Frequency Division Multiplexing (FDM).

As illustrated in FIG. 2, a small portion of the lower frequency spectrum is typically assigned to the upstream channels (F1 to F2), followed by guard band (F2 to F3) and then followed by an upper frequency spectrum assigned to the downstream channels (F3 to F4). This frequency band splitting leads to a substantial asymmetry in the upstream versus the downstream frequency spectrum allocation, where the downstream frequency spectrum is many times wider than that of the upstream spectrum. Furthermore, the lower frequency spectrum is more susceptible to external noise ingress than the upper spectrum and therefore can only supports lower orders of Quadrature Amplitude Modulation (QAM), leading to lower overall data capacity efficiencies per channel.

The following are descriptions of signal flow from the head-end office 1 toward the customer premises 8, also referred to as "Downstream" signals, in a cable TV HFC system. Video feeds from various sources 2, such as satellite receivers, fiber optic cables or microwave links, are funneled at the head-end office 1 to a network of RF channel combiners 3. Internet data communications is managed by a central equipment called Cable Modem Termination System (CMTS) 12. The CMTS 12 bridges a large number of cable modems at customer premises 8 and the Internet 13. This bridging function is achieved by broadcasting encrypted data and control packets to the connected cable modems 9 and allocating time slots for individual cable modems 9 to access the shared upstream path. The CMTS 12 features downstream RF ports, each connected to RF channel combiner 3. The combined video channels and CMTS data channels are then converted to optical signal by optical transmitters 4, and the optical signal is then launched into fiber optic cables 5 connecting the head-end office 1 with optical node 6. At the optical node 6, the optical downstream signal is converted to an electrical signal, amplified, and sent toward the customer premises 8 via the coax distribution network 7. At the customer premises 8, coaxial cables connect to a set top box 15 or directly to TV sets. The coaxial signal is also connected to the cable modem 9, where data packets destined for its specific customer are captured and sent to a computer 10 via a local computer port 14.

The following are description of the signal flow from the customer premises 8 toward the head-end office 1, also referred to as "Upstream" signals, in a cable TV HFC system. The upstream path resources are shared among a large number of customers, and therefore a critical role of the CMTS 12 is to dynamically allocate time slots and frequency channel/s for each customer premises equipment and thereby avoid collisions. Data packets generated by the customer's computer 10 are received by the cable modem 9 via its computer port 14. These RF modulated data packets, ultimately destined for the Internet 13, then are transmitted on the upstream channels of the coax distribution network 7 by the associated cable modem 9 on its allocated time slots and frequency channel/s. Upstream data signal traversing over the coax distribution network 7 are received by the optical node 6, converted to optical signal, and sent to the head-end office 1 via fiber optic link 5. At the head-end office 1, optical upstream signals containing data packets from numerous cable modems 9 are then converted to electrical signals via optical receiver 11 and delivered to the CMTS 12 upstream port. The upstream data packets are then processed by the CMTS 12, their destination address modified according to switching and routing tables, and then sent to the Internet 13.

FIG. 3 illustrates a cable TV Fiber to the Home (FTTH) system, where multiple customers receive their video signals and communicate with the Internet via cable modems. The cable TV FTTH system is comprised of the head-end office 1, fiber optic cables, small optical nodes 6 on the side of each customer building, and customer premises equipment. The head-end office 1 can serve a very large number of customers, often an entire city or a metro area. The head-end office 1 may also serve both HFC & FTTH customers. Cable TV FTTH systems rely on transporting a number of signals bidirectionally over a single fiber optic cable by employing a well-established technology called Wavelength Division Multiplexing (WDM), whereby each signal type is transmitted using a unique optical wavelength, also referred to as "color". Cable FTTH system places the optical node 6 physically very close to, or on the side of the customer building that it serves. This arrangement brings the fiber optic cable into or near the customer premises 8, and hence, this architecture is known as a Fiber To The Home (FTTH) system.

The following are descriptions of signal flow from the head-end 1 toward the customer premises 8, also referred to as "Downstream" signals, in a cable TV FTTH system. Video feeds 16 from various sources, such as satellite receivers, fiber optic cables or microwave links, are funneled at the head-end office 1 and optically transmitted on a specific wavelength λ1. Internet data communications is managed by a CMTS 12. The CMTS 12 bridges a large number of cable modems 9 at customer premises 8 and the Internet 13. This bridging function is achieved by broadcasting encrypted data and control packets to the connected cable modems 9 and allocating time slots for individual cable modems 9 to access the shared upstream path. The CMTS 12 features downstream RF ports, each connected to an optical transmitter 4 that converts the CMTS downstream signal to an optical signal with wavelength of λ2. The video channels and CMTS downstream data channels are then optically combined by optical combiner 19. A wavelength division multiplexer/de-multiplexer (WDM Mux/D-Mux) 17 then launches the combined downstream optical signals into long distance fiber optic cables 5 connecting the head-end office 1 with optical splitter 18. Optical splitter 18 is used to split the optical signal present on optical cable 5 into N number of optical signals, each connected to a specific FTTH optical node 6. Optical splitter 18 performs the opposite in the upstream direction, combining the optical signals transmitted by the various optical nodes 6 and launches the combined upstream optical signal into optical cable 5.

The optical node 6 at each customer premise 8 then converts optical signals to electrical signals in the downstream direction and converts the electrical signals into optical signals in the upstream direction. At the optical node 6, the optical downstream signal which contain both video channels and data channels is converted to an electrical signal, amplified, and sent toward the customer premises 8 via a coax cable. At the customer premises 8, the coax cable connects to a set top box or directly to a TV set for video reception. The coax signal is also connected to cable modem 9, where downstream data packets destined for its specific customer are captured and sent to a local computer port 14.

The following are description of the signal flow from the customer premises 8 toward the head-end office 1, also referred to as "Upstream" signals, in a cable TV FTTH system. The upstream path resources are shared among a large number of customers and therefore a critical role of the CMTS 12 is to dynamically allocate time slots for each customer premises equipment and thereby avoid collisions. Data packets generated by the customer's computer 10 are received by the cable modem 9 via its computer port 14. These data packets, ultimately destined for the Internet 13, are then transmitted on the upstream channels of the coax cable by the associated cable modem 9 on its allocated time slots. Upstream data signal traversing over the coax cable are then received by the optical node 6, converted to optical signal with wavelength λ3 and sent toward optical splitter 18, where the optical upstream signal is sent toward the head-end office 1 via fiber optic link 5. At the head-end office 1, optical upstream signals containing RF modulated data packets from numerous cable modems 9 are demultiplexed by the Mux/D-Mux 17, converted to electrical signals via optical receiver 11, and delivered to the CMTS 12 upstream port. The upstream data packets are then processed by the CMTS 12, their destination address modified according to switching and routing tables and sent to the Internet 13.

Extending the optical fiber deeper into the network 20 edge reduces or eliminates altogether RF amplifiers which enhances system capacity but at the same time increases the number of optical nodes substantially. As can be observed in FIG. 4, as the number of optical nodes 6 is increased, the number of optical spans connecting the optical nodes 6 to the head-end office 1 increases proportionally. Two existing techniques attempt to address upstream aggregation: optical node daisy chaining, and Radio Frequency over Glass (RFoG).

FIG. 5 illustrates a daisy chaining technique for upstream aggregation. In this technique, aggregation of the upstream channels from multiple optical nodes 6 at the edge of a fiber deep network 20 is accomplished by daisy chaining optical nodes using fiber optic, resulting with only the last optical node in the chain sending a single optical signal to the head-end office 1. This reduces the need and cost associated with increasing the long-haul portion of the optical transport connecting optical nodes 6 to the head-end office 1. However, prior art daisy chaining techniques present several disadvantages: single point of failure; complicated management; and noise funneling.

Daisy chain systems are very susceptible to a single point of failure since RF samples from optical nodes 6 must traverse through multiple other optical nodes 6A before reaching the optical receiver 11 at the head-end office 1. A failure in any optical node 6A in the chain, or a failure of any fiber span in the chain, will result in islands of optical node segments 6 that are disconnected from the optical receiver 11. The failure rate is directly proportional to the size of the daisy chain system, where an increase in the number of optical nodes and optical spans in the chain increases the likelihood of failure. This therefore limits the practical number of optical nodes that can be in the daisy chain system.

Daisy chain systems further have the disadvantage of requiring complicated management. Managing and monitoring large numbers of optical nodes 6 involve several processes, including the capability of the system to dynamically discover network topology, assign an address to each optical node, and establish resilient communications with each optical node even in the presence of common errors in the communication links. Daisy chained architecture requires complicated and often burdensome resources to achieve these basic management and monitoring tasks. Furthermore, in an event of equipment or plant failure, some or most monitoring functions cease to function at most inopportune times.

Daisy chain systems further have the disadvantage of noise Funneling. The digital summing of RF samples is not noiseless. Every time the number of nodes in a digital daisy chained system is doubled, the noise floor on the RF output of the system will be increased by 3 dB. This limits the practical number of optical nodes that can be in a daisy chain system.

FIG. 6 illustrates prior art Radio Frequency over Glass (RFoG) technique for upstream aggregation. RFoG aggregates the upstream channels from multiple optical nodes 6 at the edge of fiber deep network 20. A 1×N passive optical splitter 18 is used to connect multiple optical nodes to the head end office 1. To reduce noise funneling of multiple connected optical nodes, the optical nodes 6 are equipped with burst type analog laser transmitters. The laser on-board the optical nodes 6 are turned-on only during the duration that a RF signal generated by Customer Premises Equipment (CPE) is detected. As illustrated in FIG. 7, these RF burst signals are composed of a preamble section 21 followed by modulated data sections 22. Furthermore, the preamble section 21 of the burst is shaped in a way that resembles function of sin x/x. This signal shaping is essential to allow rapid signal locking by the burst receiver circuit of the CMTS 12 or other burst QAM receivers. The RFoG technique, however, presents several disadvantages: loss of preamble; limited number of optical nodes; lower upstream link performance; and optical beating interference.

RF burst detection circuit in the optical node 6 is programmed to define "Start of Burst" only after the level of RF signal reaches certain predetermined amplitude (threshold) and the burst duration is longer than predetermined period. As illustrated in FIG. 8, this leads to a delay from the start of the RF burst to turning-on the laser. Once the laser is turned-on, additional delay occurs until the laser reaches its full power. Because of these delays some portion of the preamble signal is lost. The partial loss of preamble section 21 can lead to malfunction at the burst receiver at the CMTS 12, and therefore, RFoG systems must use longer preamble fields to compensate. This results in a lower throughput of the system.

The RFoG technique further has the disadvantage of limiting the practical number of optical nodes. RFoG type optical nodes include an analog laser that converts the detected upstream RF burst to optical bursts destined to reach the head-end office 1. Laser turn-on time delay is a function of multiple parameters, among them laser optical power output at "off state". The lower the optical power at "off state" the longer it takes for the laser to turn on. One method to reduce laser turn-on time is by not turning the laser off completely when no RF signal is present. The downside of this method is injection of unmodulated light into the fiber cable between RF bursts. Accumulation of this un-modulate light generated by connected optical nodes will eventually leads to saturation of the upstream optical receiver and hence limits the practical maximum number of optical nodes in a RFoG system.

The RFoG technique further has the disadvantage of lower upstream link performance. RFoG optical nodes rely on Amplitude Modulated analog laser for the upstream path. The performance of AM modulated optical transmission systems varies with temperature changes, link distances and laser diode analog performance. The net result of these dependencies is lower overall performance and reduced throughput of the upstream channel.

The RFoG technique further has the disadvantage of optical beating interference. Optical Beating Interference (OBI) is a phenomenon that can occur if multiple optical nodes burst at the same time and their wavelengths are close to each other. The likelihood of OBI increases as the number of optical nodes is increased and whenever upstream traffic generated by CPE units is increased. Existing techniques have attempted to mitigate OBI by deploying two methods. The first method relies on lasers with adjustable wavelength while the second method relies on replacing passive optical splitter with an active splitter. However, with the first method, adjusting the wavelength of each laser in a system limits the maximum number of optical nodes to available wavelength slots that are far apart enough so as not to cause OBI, and thereby essentially limiting the practical number of optical nodes in a system. With the second method, an active splitter entails the use of dedicated optical-to-electrical (OE) conversion hardware for each optical node upstream path. However, every analog OE converter also generates thermal noise that it is added to the converted signal. Accumulation of thermal noise contributed by each OE converter stage essentially limits the maximum number of R-ONU units. FIG. 9 illustrates a RFoG system where the passive 1×N optical splitter 19 has been replaced with 1×N active splitter 23, avoiding OBI by terminating every optical node with an active port and combining the resulting upstream RF signals with analog RF combiners.

The RFoG technique further has the disadvantage of a lack of a management facility. RFoG systems treat the optical nodes as "dumb" devices and therefore do not provide any facilities to manage, monitor or control these optical nodes. This leads to lack of visibility into major parts of the cable TV systems where optical nodes account for most of the active devices in a RFoG network. Furthermore, lack of management facilities leads to lack of means to program the optical nodes and therefore all RF and optical parameters in the optical nodes are hard coded and inflexible. Anytime a different burst detection profile is desired, all optical nodes must be replaced with units that have the new parameters hard coded in their circuitry.

BRIEF SUMMARY OF THE INVENTION

Disclosed herein is a system for digital aggregation of upstream traffic in a network, as specified in the independent claims. Embodiments of the present invention are given in the dependent claims. Embodiments of the present invention can be freely combined with each other if they are not mutually exclusive.

According to one embodiment of the present invention, a system for digital aggregation of upstream traffic in a network includes a plurality of optical nodes coupled to a customer distribution network. A plurality of dedicated optical fiber spans is coupled to the plurality of optical nodes, where each optical node of the plurality of optical nodes is assigned a dedicated optical fiber span of the plurality of dedicated optical fiber spans. An upstream aggregator is coupled to each of the plurality of dedicated optical fiber spans. The upstream aggregator receives digital data from each of the plurality of optical nodes over each of the plurality of dedicated optical fiber spans assigned to each of the plurality of optical nodes, aggregates the digital data received from each of the plurality of optical nodes, and outputs the aggregated digital data. The system further includes a digital receiver coupled to the upstream aggregator. The digital receiver receives the aggregated digital data from the upstream aggregator, processes the aggregated digital data; and outputs the processed aggregated digital data to the network.

In one aspect of the present invention, the plurality of optical nodes is directly coupled in parallel to the upstream aggregator via the plurality dedicated optical fiber spans.

In another aspect of the present invention, the system further includes a passive splitter coupled to the plurality of dedicated optical fiber spans, where the plurality of optical nodes is directly coupled in parallel to the passive splitter via the plurality of dedicated optical fiber spans. The system further includes a single wavelength division multiplexing (WDM) access fiber coupled to the passive splitter and a wavelength division multiplexer and de-multiplexer (WDM Mux/De-Mux), which is coupled to the passive splitter via the single WDM access fiber and to the upstream aggregator.

BRIEF DESCRIPTION OF THE SEVERAL VIEWS OF THE FIGURES

FIG. 15AB illustrates an exemplary embodiment of the RF Signal Power Measurement 716 of the aggregation controller 508 according to the invention.

FIG. 15AC illustrates a second exemplary embodiment of the aggregation controller 508 according to the invention.

FIG. 15AD illustrates a third exemplary embodiment of the aggregation controller 508 according to the invention.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
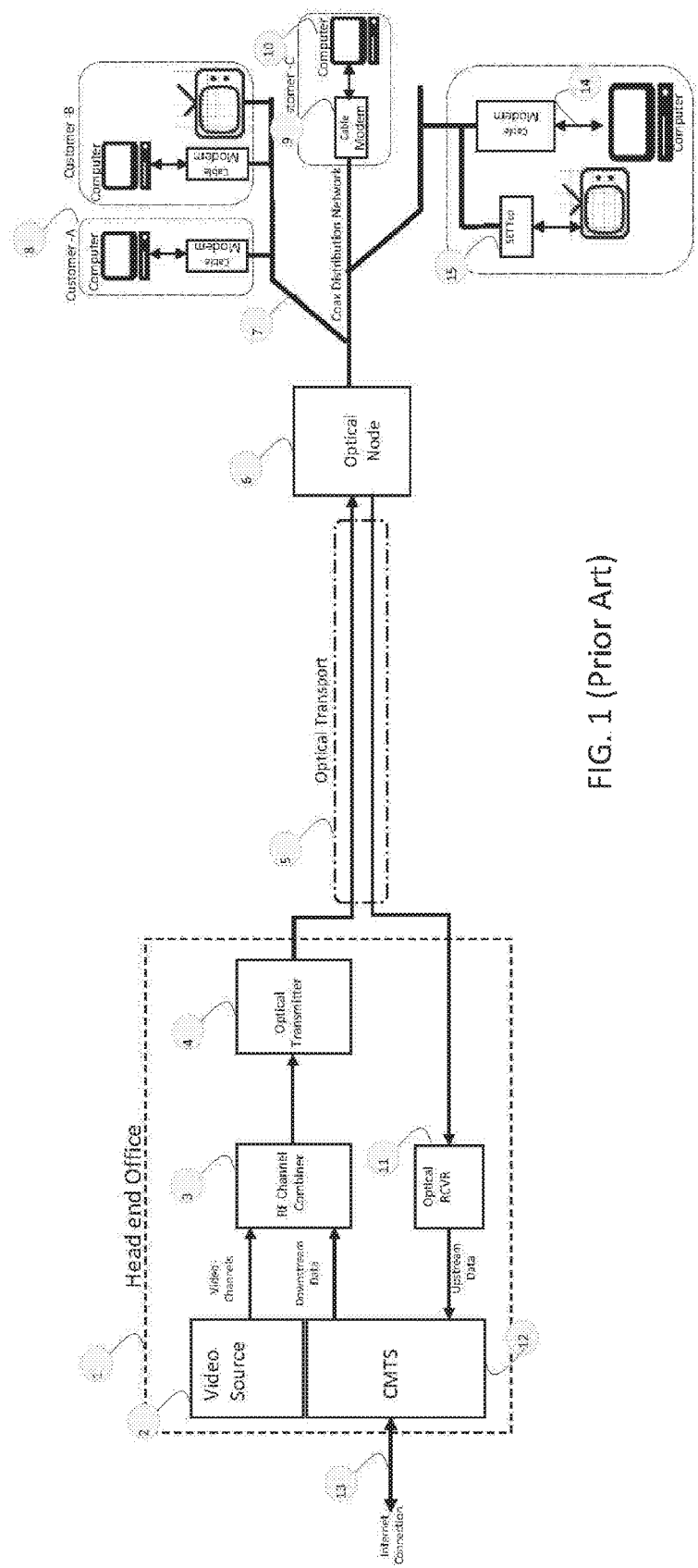
FIG. 1 illustrates a conventional cable television system utilizing a Hybrid Fiber Coax (HFC) architecture.
Figure 2:
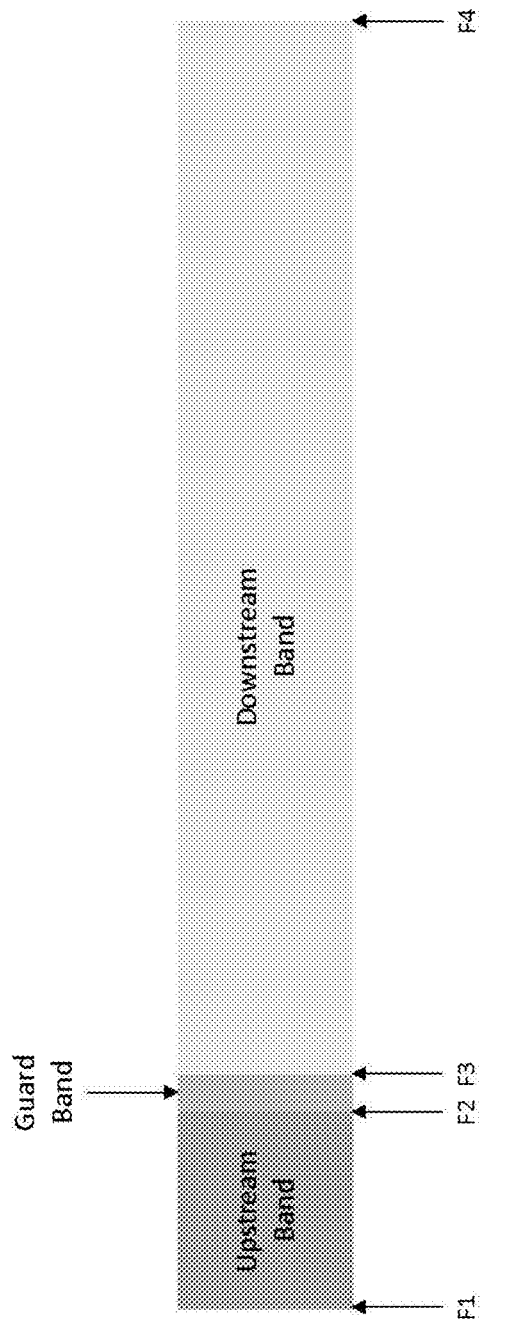
FIG. 2 illustrates a conventional frequency spectrum used in the cable television system.
Figure 3:
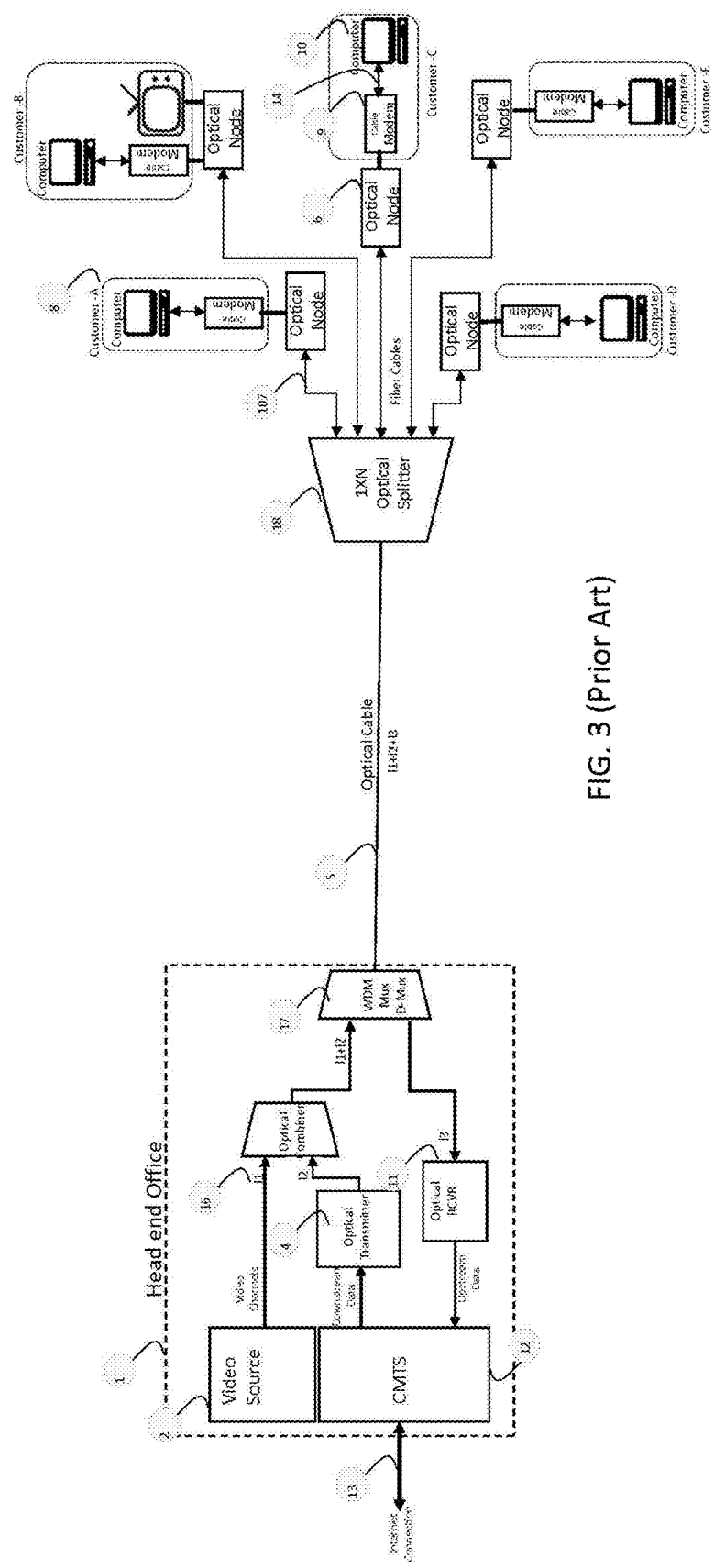
FIG. 3 illustrates another conventional cable television system utilizing a Fiber to the Home (FTTH) architecture.
Figure 4:
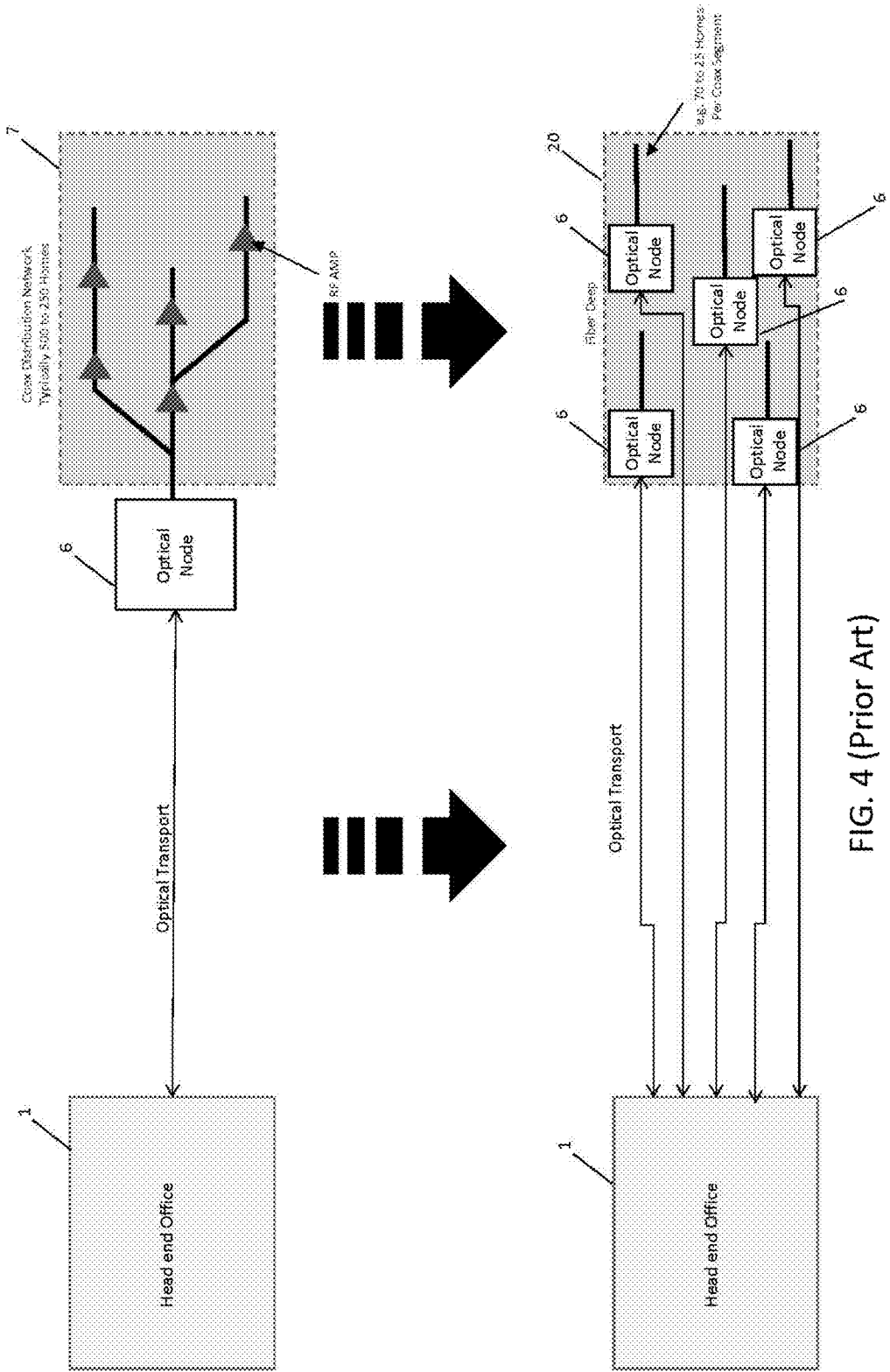
FIG. 4 further illustrates a conventional cable television system utilizing the HFC and Fiber Deep architectures.
Figure 5:
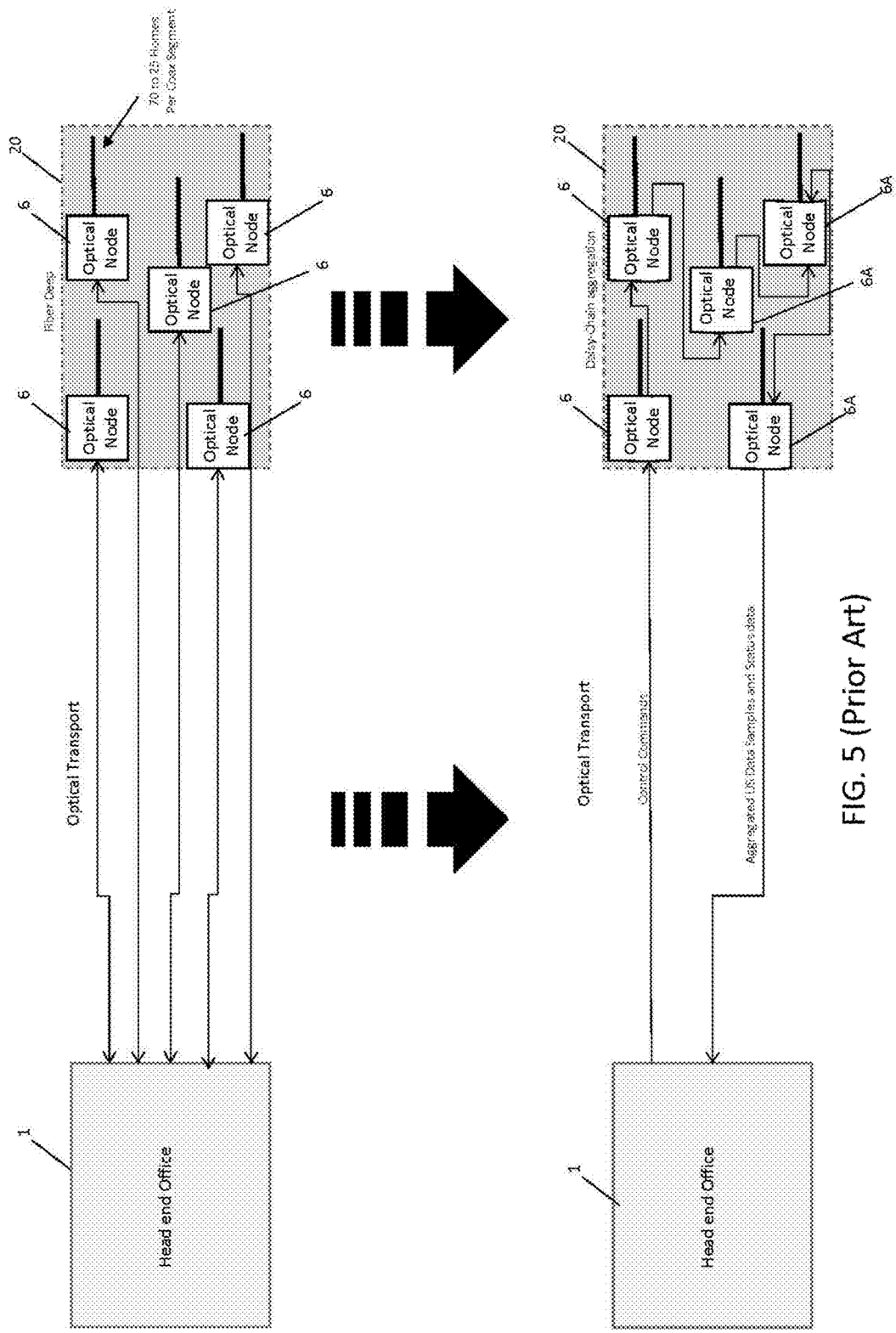
FIG. 5 illustrates a conventional daisy chaining technique for upstream aggregation.
Figure 6:
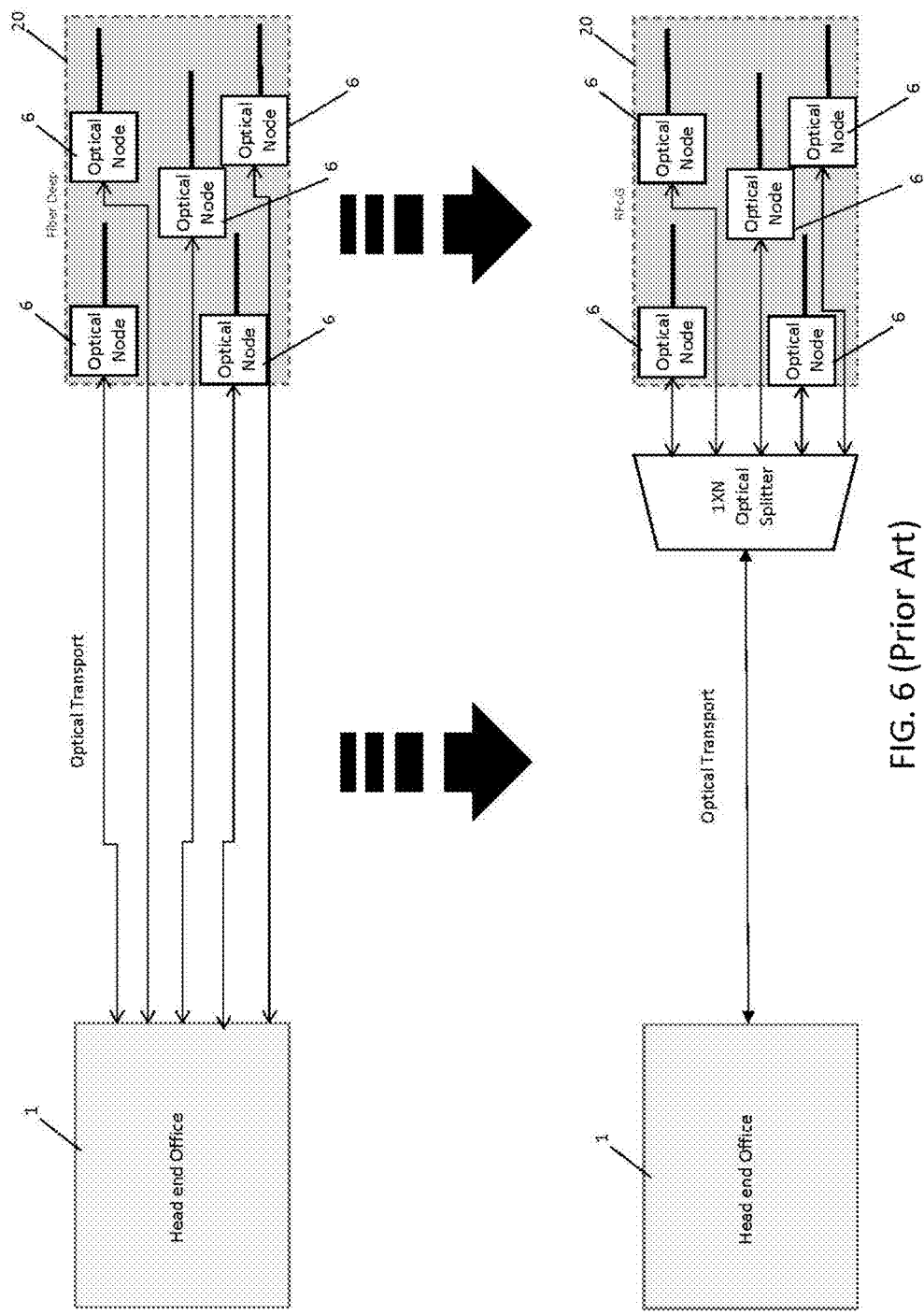
FIG. 6 illustrates a Radio Frequency over Glass (RFoG) technique for upstream aggregation.
Figure 7:
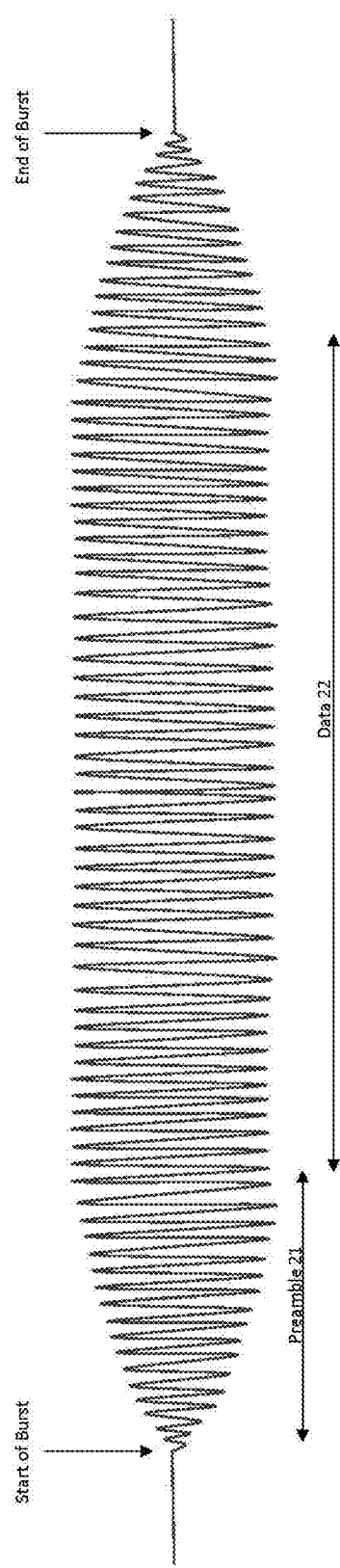
FIG. 7 illustrates a conventional Radio Frequency (RF) burst signal.
Figure 8:
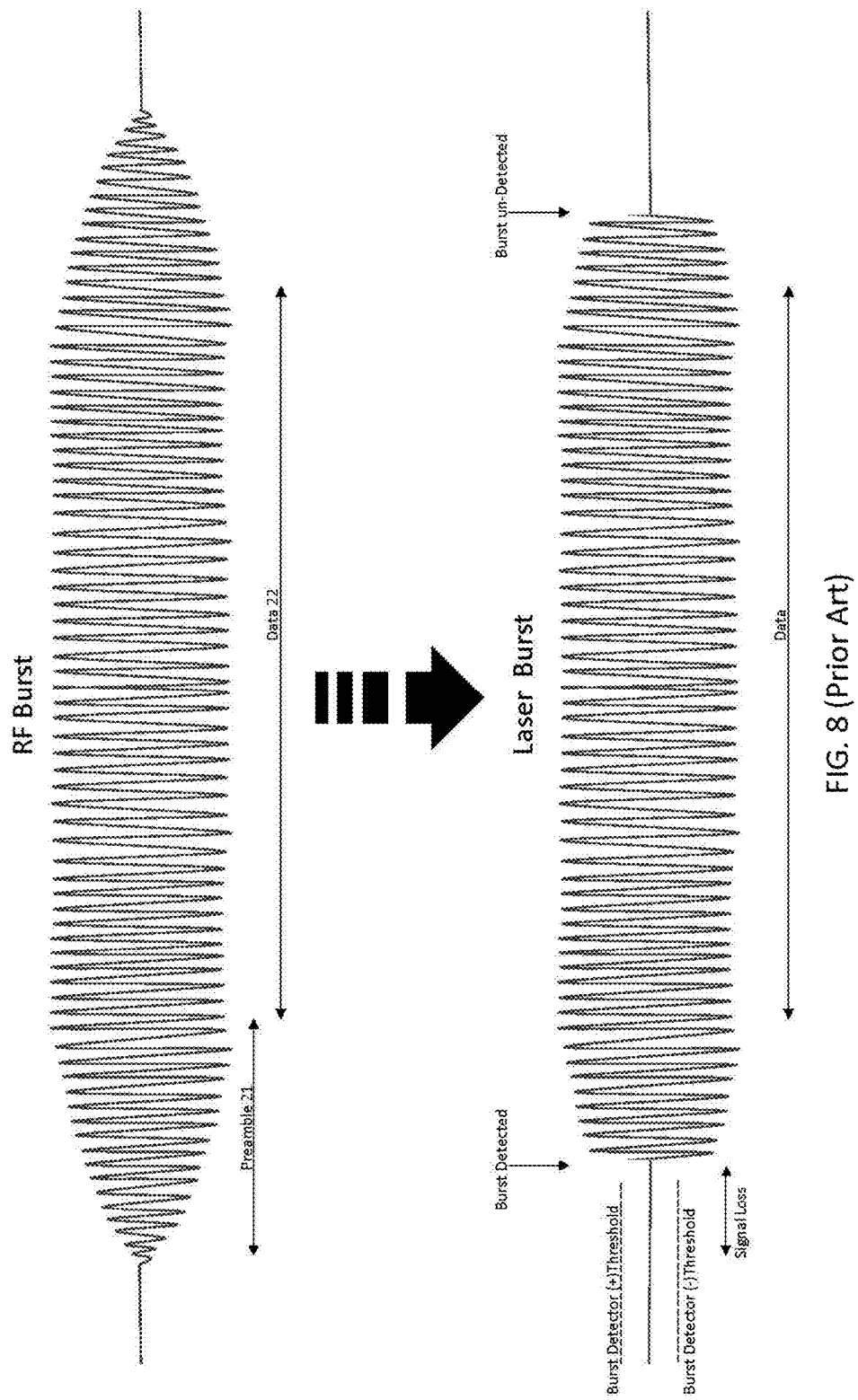
FIG. 8 illustrates signal loss in the conventional RF burst signal due to lasers at the optical node.
Figure 9:
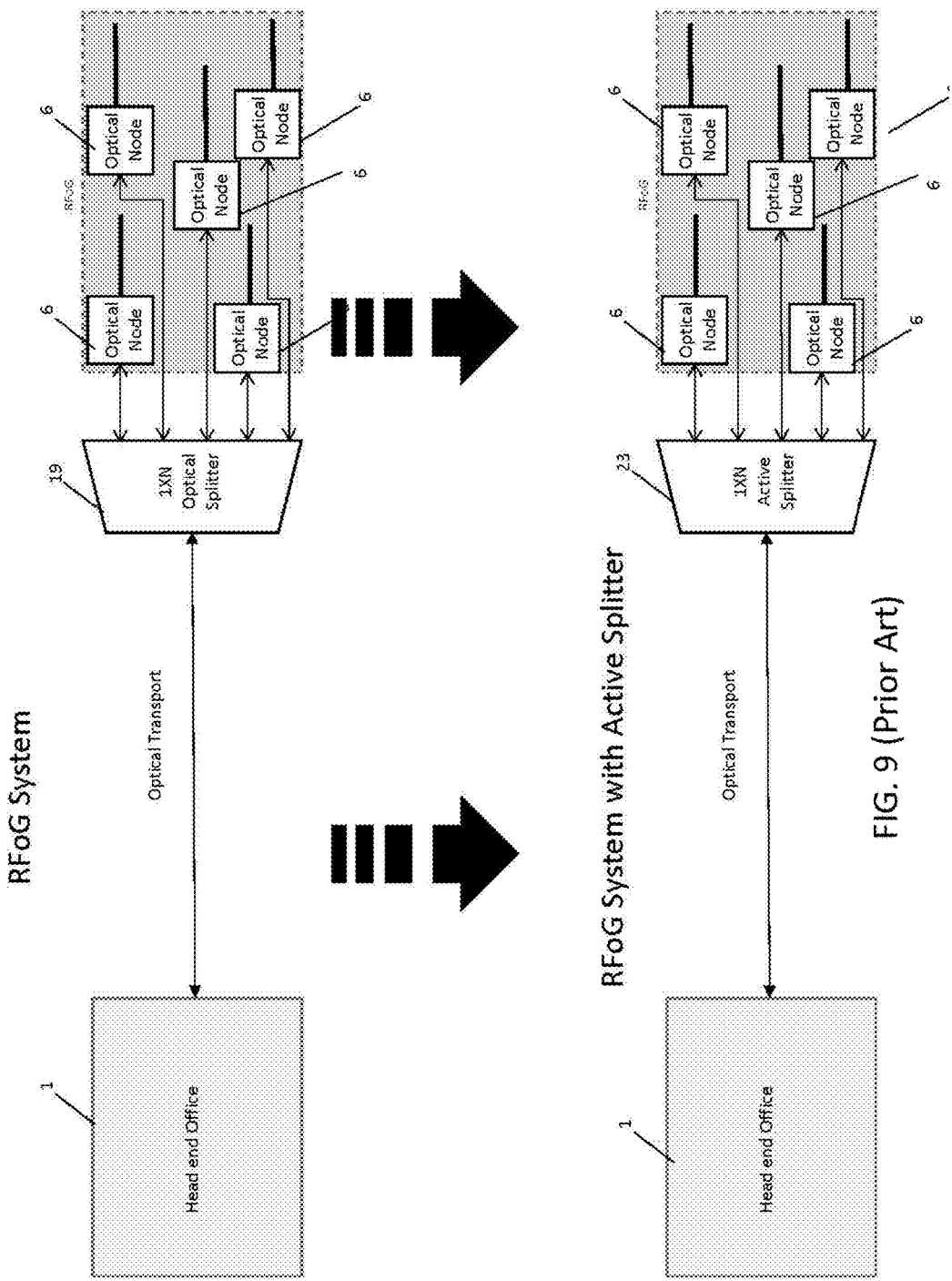
FIG. 9 illustrates optical beating interference in a conventional RFoG system.
Figure 10A:
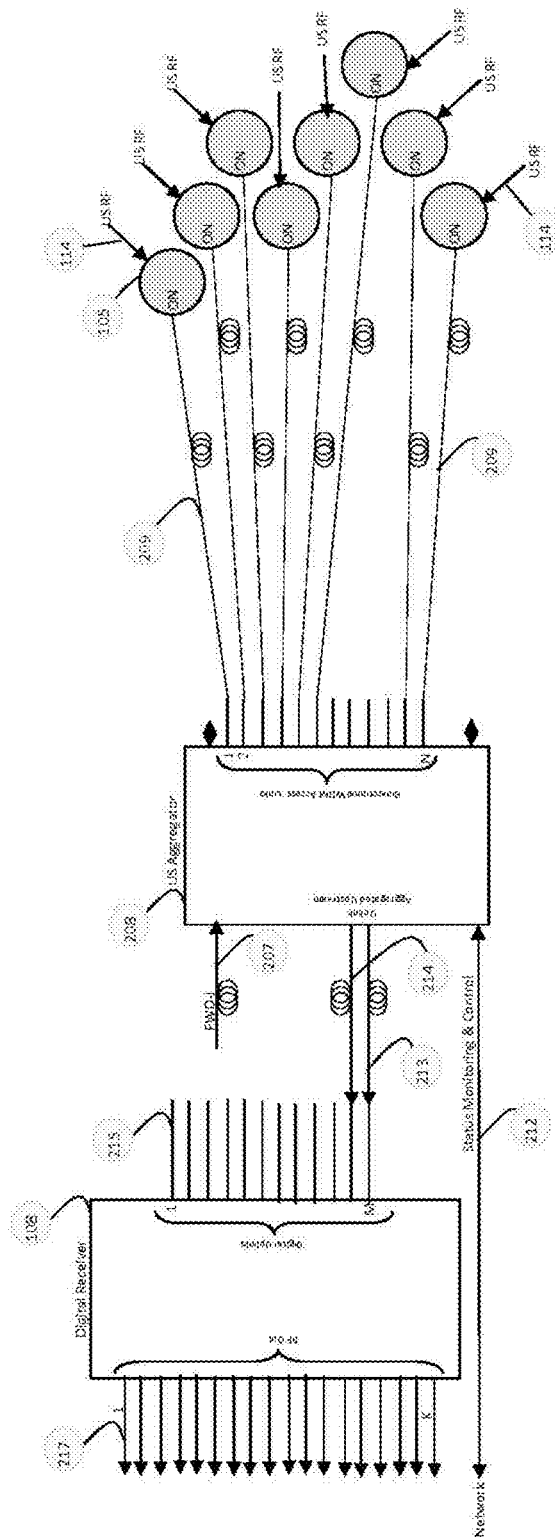
FIG. 10A illustrates a first exemplary embodiment of a system for digital aggregation of upstream traffic according to the invention.

FIGS. 1-16B uses the following reference numerals:
1 Head-End Office
2 Video Sources
3 Radio Frequency Combiner
4 Optical transmitters
5 Fiber Optic Cables
6 Optical Node
6A Optical Node
7 Coax Distribution Network
8 Customer Premises
9 Cable Modems
10 Computer
11 Optical Receiver
12 Cable Modem Terminal System (CMTS)
13 Internet
14 Local Computer Port
15 Set Top Box
16 Video Feeds
17 Wavelength Division Multiplexer/De-Multiplexer (WDM Mux/D-Mux)
18 1×N Optical Splitter
19 Optical Combiner
20 Fiber Deep Network
21 Preamble Section of RF Burst Signal
22 Data Sections of RF Burst Signal
23 1×N Active Splitter
101 Digital Transmitter
102 Serializer
103 Laser Diode
104 Optical Splitter
105 Optical Node
106 Photo Detector
107 De-Serializer
108 Digital Receiver
109 Digital Forward Fiber Span
110 Fiber Span—from $1^{st}$ Optical Node
111 Fiber Span—from intermediate Optical Node
113 Fiber Span—From Last Optical Node
114 Upstream RF Input
206 Cascading Bus
207 Forward Optical Signal
208 Upstream Aggregator
209 Fiber Span—Dedicated to a single Optical Node
212 Management Link
213 Aggregated Digital Return Link—Primary
214 Aggregated Digital Return Link—Secondary
215 Digital Return Link Input
217 RF Output
301 WDM Multiplexer/De-Multiplexer
301A WDM Multiplexer/De-Multiplexer
302 WDM Access Fiber
406 Impedance Matching Circuit
407 Analog Trans-Impedance Amplifier
408 Variable Gain Amplifier
409 Amplifier
410 Transformer
411 Frequency Tilt Compensator
412 Forward RF Signal
413 Coax Distribution Cable
414 Diplexer 415 Forward Feedback
416 Clock Detector
417 Temperature Compensation
418 RF Burst Detector
419 Automatic Gain Control
420 Received Optical Power Level Indicator
421 Control Bus
422 Master Clock
423 Received Optical Power Sense
424 Temperature Sensor
425 Optical Node Controller
426 Antenna
427 GPS Receiver
432 Phased Locked Loop
433 Sampling Clock
434 Analog to Digital Converter
435 Anti-Aliasing Filter
436 Control Bus-3
439 Control Bus-4103
440 Variable Band-pass Filter
442 Upstream RF Signal
445 Laser Tuning Control
502 Fiber Amplifier
504 RF Optical Forward Signal
505 Digital Upstream Link
507 Digital Optical Forward Signal
510 Serial Transmitter
511 Optical Port Receiver
521 management Processor
604 Optical Power Coupler
605 Combined RF and Digital Forward
618 WDM DE-MUX
620 WDM multiplexer/de-multiplexer
621 WDM Upstream Optical Signal
701 Aggregated digital upstream data
702 Upstream digital RF TDM multiplexer
703 Digital Summator
704 Digital sample Router
70$x$ TDM Aggregated digital upstream data
706 TDM MUX
712 Digitized RF sample data
713 Digitized Upstream Data
714 De-Multiplexer
715 FIFO
716 RF Signal Power Measurement
717 RF Detect Parameters Memory
718 Burst Processor-1
719 Digital Switch
731 Data DE-Multiplexer
733 Burst Processor-K
735 Quiet Code Generator-1
736 TDM Aggregated digital upstream data
738 Quiet Code Generator-2
750 Variable bandpass Filter
751 Filtered RF Data
752 RF Power Detector
753 RF Power Level
754 RF Signal Measurement Processor
755 RF detect Parameters
756 A/B Switch Control
757 FIFO Pointer Control Bus
802 RF Data Converter
805 DAC
806 Upstream Digital Receiver Controller
815 RF Filter
816 TDM De-Multiplexer
1040 Passive Splitter of Upstream Aggregator FIG. 10A illustrates a first exemplary embodiment of a system for digital aggregation of upstream traffic according to the invention. The system comprises a plurality of optical nodes 105, coupled to a coax distribution network (not shown), where each optical node 105 has a dedicated span 209 connecting the corresponding optical node 105 with the upstream aggregator 208 in parallel. The upstream aggregator 208 resides between the plurality of optical nodes 105 and the head-end office (not shown), and proximate to the plurality of optical nodes 105. Each optical node 105 internally samples its upstream RF input 114 and converts the RF data to serial high-speed digital data format. The converted RF data is transmitted by each optical node 105 to the upstream aggregator 208 via the optical node's corresponding span 209 in a serial format. Upstream aggregator 208 receives serial data from the plurality of spans 209, extracts digital data samples sent by the plurality of optical nodes 105, and stores the received samples in its internal memory buffers (not shown). Upstream aggregator 208 performs binary addition, or digital summation, processing of digital data samples received from the plurality of optical nodes 105, and outputs the resulting data contains the sum data and carryover data components of the digital summation processing to a digital receiver 108 residing at the head-end office. The optical node 105 is described in more detail further below with reference to FIGS. 12A, 12B, and 12C.

In the first exemplary embodiment, the upstream aggregator 208 performs binary summation of all input span 209 ports, port 1-port N. The resulting sum data and carry data then are sent in a serial format to the digital receiver 108 via span 214. Optionally, upstream aggregator 208 transmits the sum data and carry data on both span 213 and span 214 simultaneously, thus providing redundant upstream routes to protect against failure in span 213 or span 214. Optionally, upstream aggregator 208 includes multiple independent binary summing facilities, each with configurable input ports. Each binary summation facility can be configured to include any combination of input span 209 ports, port 1-port N. This enables load sharing between span 213 and span 214.

Digital receiver 108 receives serial data from input span 213, extracts digital sum data and digital carry data samples sent by upstream aggregator 208, and stores the received data in its internal memory buffers. Digital receiver 108 converts the stored digital sum data and digital carry data back to RF data format through its internal digital to analog converter facility. The resulting RF data is sent to RF output port 217. Optionally, when data is transmitted redundantly on both span 213 and span 214 by the upstream aggregator 208, the digital receiver 108 receives the data redundantly on spans 213 and 214. Digital receiver 108 then selects the source of data to be used for RF conversion based on the integrity of the received serial signal from span 213 and span 214. In case of partial or full failure on input span 213, the digital receiver 108 will select data recovered from input span 214 for RF data conversion and vice versa.

Management link 212 is used by a remote status monitoring and control server (not shown) to configure and monitor the upstream aggregator 208. The remote server through link 212 configures various upstream aggregator 208 facilities, such as serial input port speed and data format, provisions binary summation facilities, configures input port membership association for each binary summation facility, and configures output port mirroring for redundancy applications.

In this exemplary embodiment, since the plurality of optical nodes 105 are connected to the upstream aggregator 208 in parallel, the plurality of optical nodes 105 may be configured to function on the same wavelength without collision. Alternatively, multi rate operations of the plurality of optical nodes 105 may be enabled. Each connected optical node 105 which is served by same upstream aggregator 208 can be configured for a different RF bandwidth, for example one optical node 105 can be configured for 5 MHz-42 MHz, a second optical node 105 can be configured for 5 MHz-85 MHz, and a third optical node 105 can be configured for 5 MHz-204 MHz. The upstream aggregator 208 receives different data rates from each connected optical node 105, processes each data stream, adjust sample rates of data stream to a uniform rate (usually to the highest incoming data rate) before performing digital summation. The upstream digital receiver 108 receives data via aggregated digital return link 213 that includes the adjusted digital sum and process the data in the manner described above.

Figure 10B:
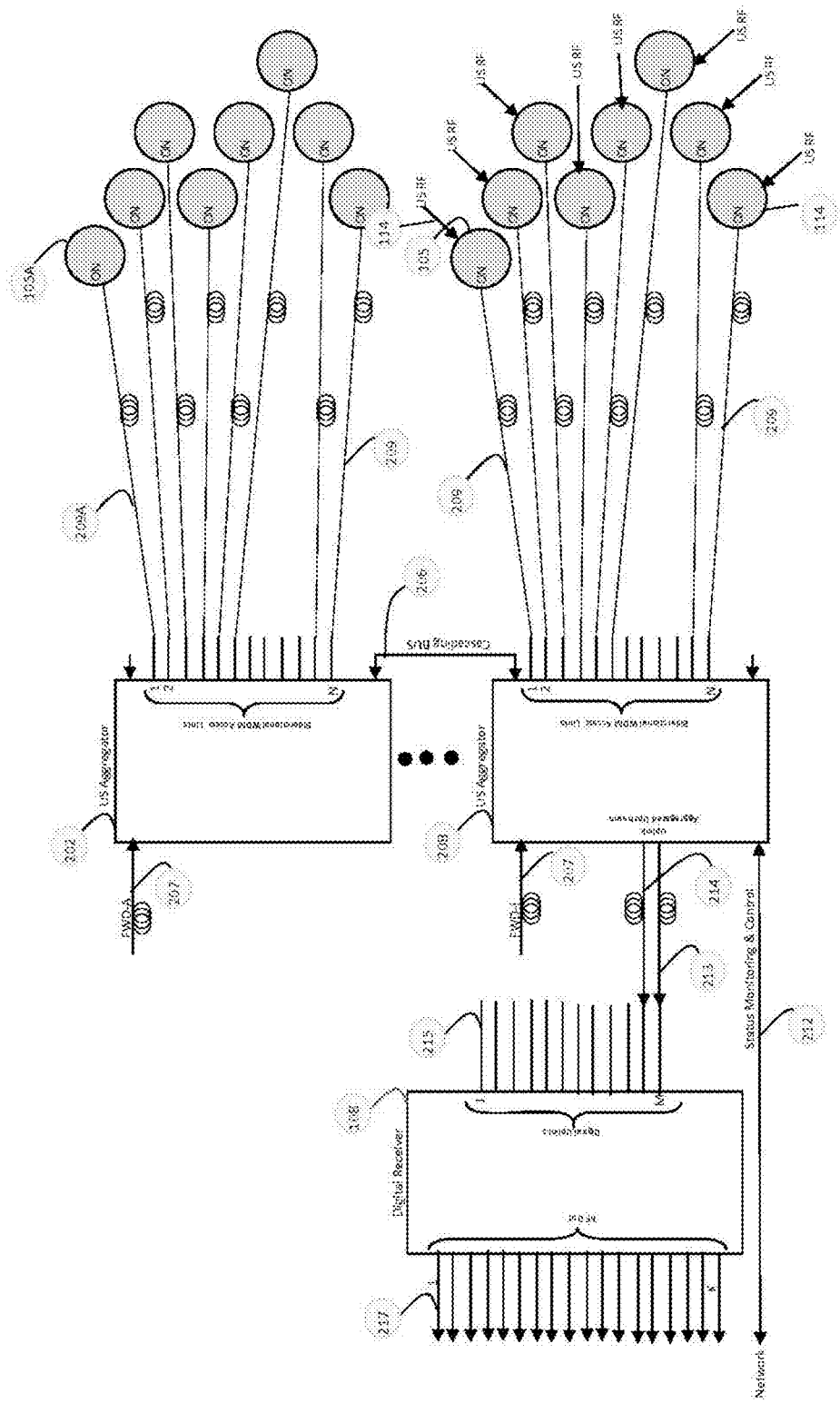
FIG. 10B illustrates a variation of the first exemplary embodiment of the system for digital aggregation of upstream traffic according to the invention.

FIG. 10B illustrates a variation of the first exemplary embodiment of the system for digital aggregation of upstream traffic according to the invention. In this variation, multiple upstream aggregators 202 and 208 are cascaded and inter-connected via cascading interface or bus 206. The cascaded upstream aggregator 202 receives data from its corresponding plurality of optical nodes 105A via spans 209A and performs digital summation in the same manner as upstream aggregator 208. The upstream aggregator 202 sends its sum data and its carry data to the cascading bus 206. Upstream aggregator 208 receives the sum data and carry data from cascading bus 206 and directs the recovered cascading data to its binary summing facility to be summed with data received from spans 209. The cascading connection of upstream aggregators 202 and 208 results in better utilization of the available bandwidth of output port 213. The cascading bus 206 is also used to convey status monitoring and control, thereby sharing a single management link 212 between the cascaded upstream aggregators 202 and 208.

Figure 11A:
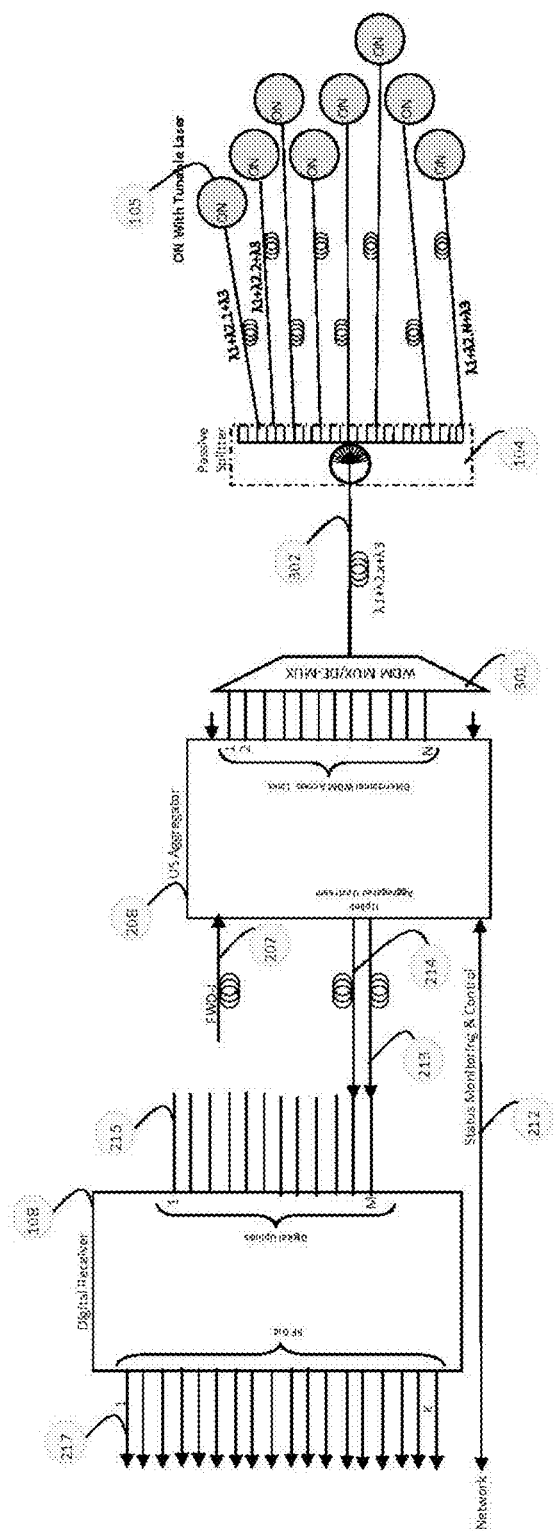
FIG. 11A illustrates a second exemplary embodiment of the system for digital aggregation of upstream traffic according to the invention.

FIG. 11A illustrates a second exemplary embodiment of the system for digital aggregation of upstream traffic according to the invention. In this exemplary embodiment, the optical nodes 105 are transmitting their data each on a different wavelength, λ2.1 through λ2.N. Since each optical node 105 transmission is on a different wavelength, a passive wavelength division multiplexer and de-multiplexer 301 may be used. This exemplary embodiment allows the use of a single span 302 to carry the upstream data traffic from the plurality of optical nodes 105 without any interference between them.

Passive splitter 104 is used to combine the digital upstream data transmitted by a plurality of optical nodes 105, configured for λ2.1 through λ2.N. The combined upstream data is transmitted toward the upstream aggregator 208 via span 302. The combined upstream data from span 302 are separated by the WDM Mux/De-Mux 301, and the separated wavelengths are transmitted to the input ports of the upstream aggregator 208. The upstream aggregator 208 performs digital summation of the data received from the WMD Mux/De-mux 301 in the same manner as described above. The WDM Mux/De-Mux 301 also receives forward data on different wavelengths from the upstream aggregator 208, combines the data into combined forward wavelengths, and sends the combined forward wavelengths to the passive splitter 104 via the single span 302. The passive splitter 104 separates the wavelengths in the combined forward wavelengths and transmits the wavelengths toward the plurality of optical nodes 105 according to their respective wavelength configurations.

Figure 11B:
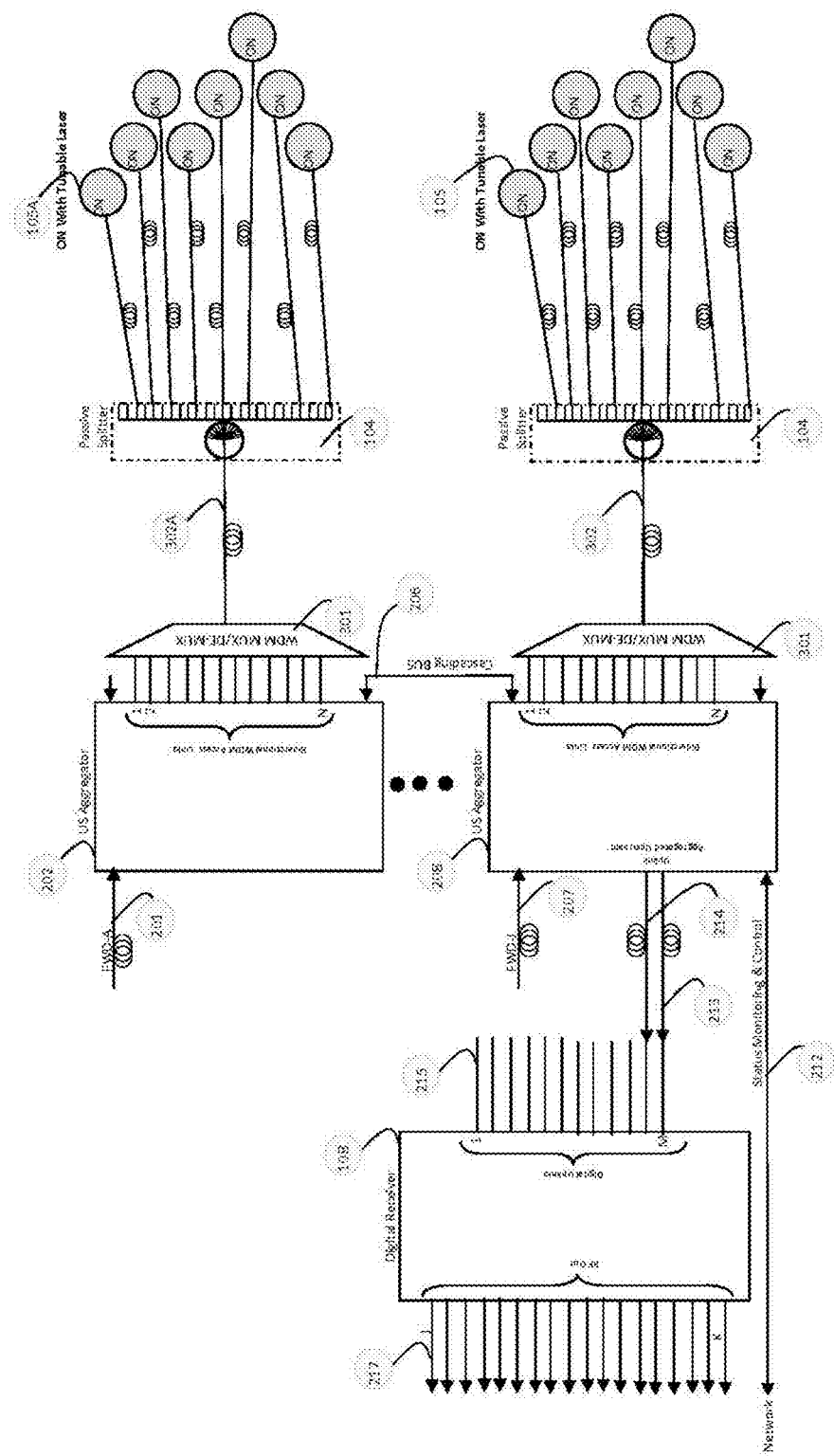
FIG. 11B illustrates a variation of the second exemplary embodiment of the system for digital aggregation of upstream traffic according to the invention.

FIG. 11B illustrates a variation of the second exemplary embodiment of the system for digital aggregation of upstream traffic according to the invention. In this variation, multiple upstream aggregators 202 and 208, with multiple WDM Mux/De-Mux 301 and 301A, are cascaded. In this variation, multiple upstream aggregators 202 and 208 are inter-connected via cascading interface 206. The cascaded upstream aggregator 202 performs digital summation of the data received from the WMD Mux/De-Mux 301A in the same manner as upstream aggregator 208, described above. The upstream aggregator 202 sends its sum data and its carry data to cascading bus 206. Upstream aggregator 208 receives the sum data and carry data from cascading bus 206 and directs the recovered cascading data to its binary summing facility to be summed with data received from the WDM Mux/De-Mux 301 via its input ports 209. The cascading connection of the upstream aggregators 202 and 208 result in better utilization of the available bandwidth of output port 213. The cascading bus 206 is also used to convey status monitoring and control communications, thereby sharing a single management link 212 between the two cascaded upstream aggregators 202 and 208. The upstream aggregator 208 is described in more detail further below with reference to FIGS. 13-14.

Figure 12A:
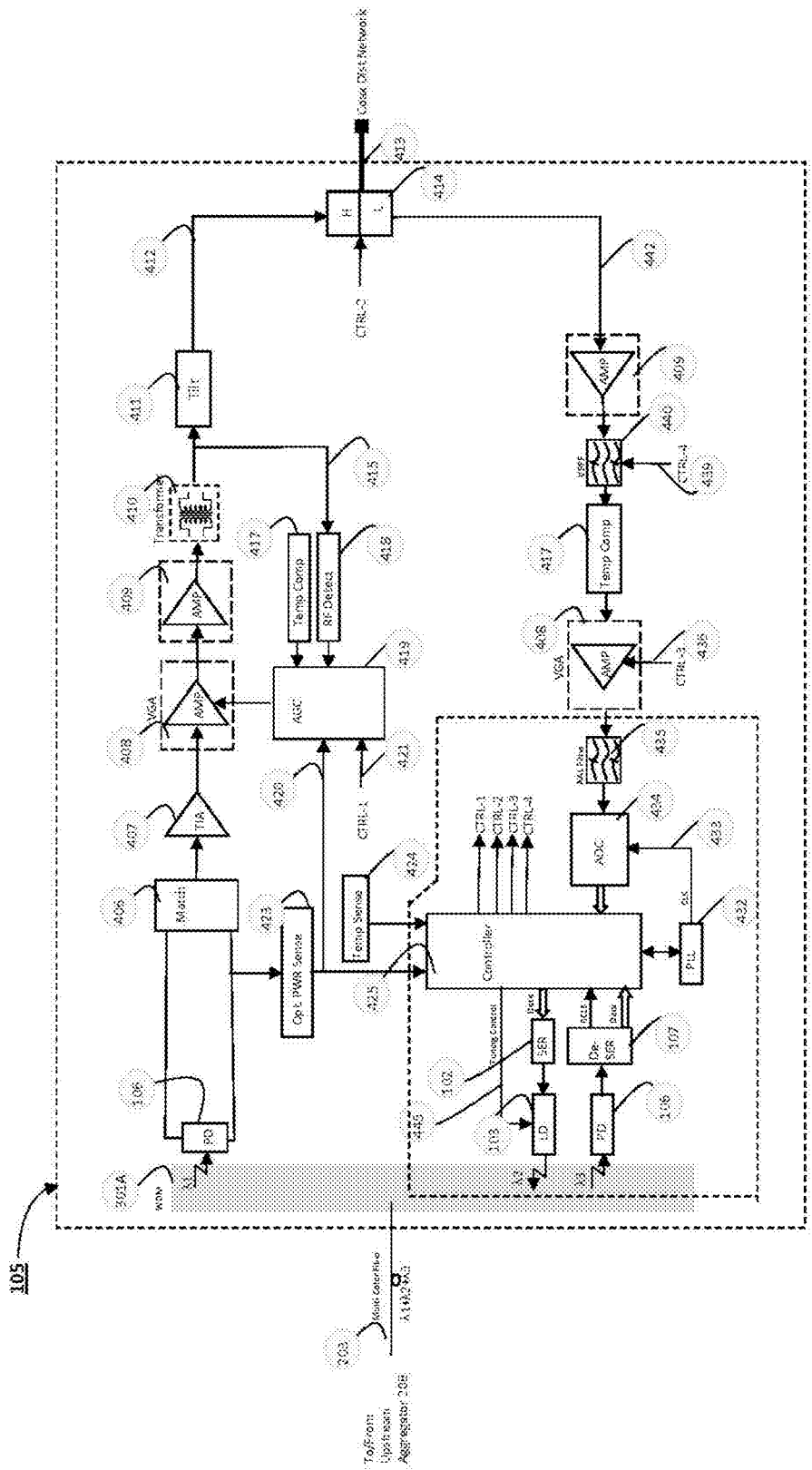
FIG. 12A illustrates the first exemplary embodiment of the optical node according to the invention.
Figure 12B:
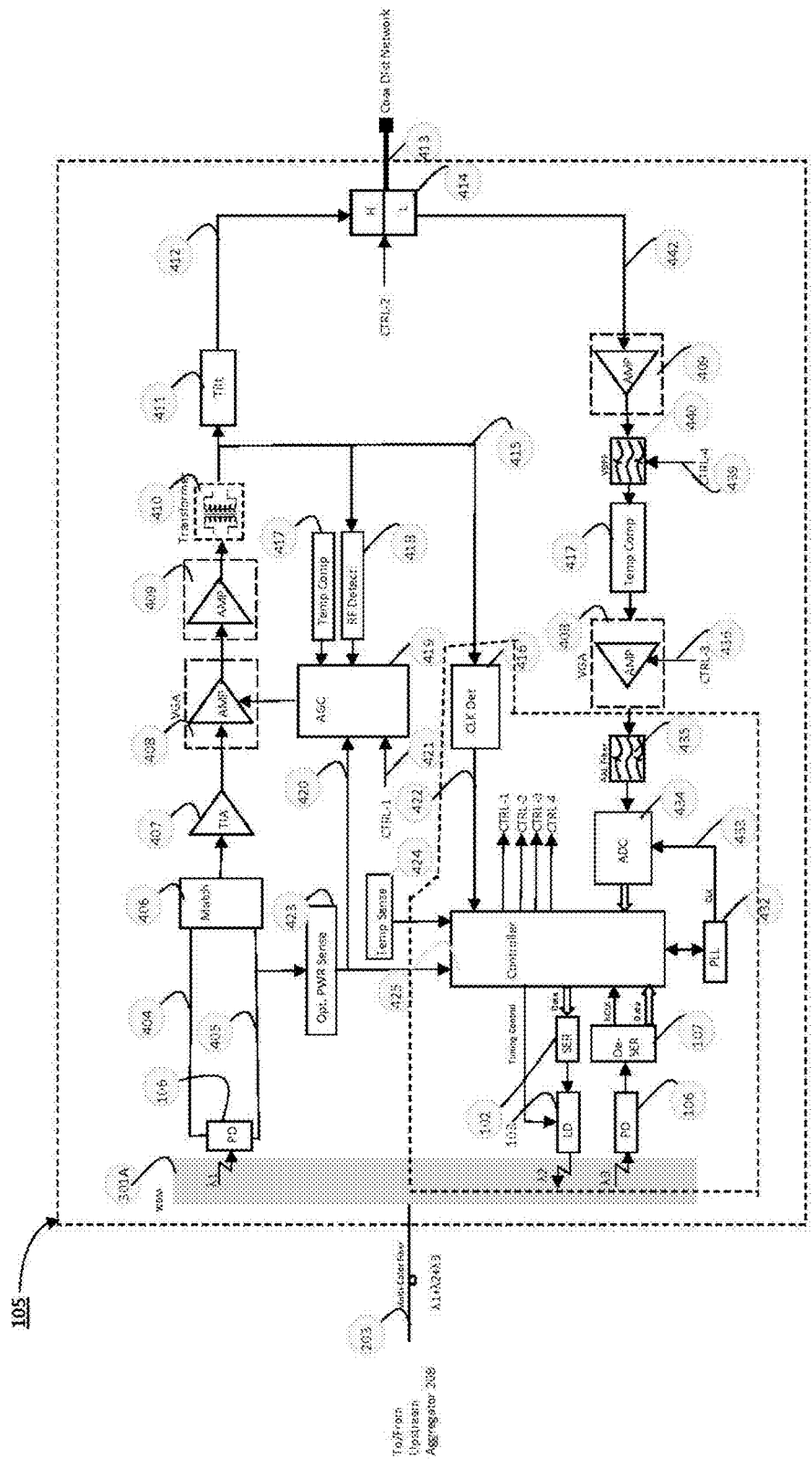
FIG. 12B illustrates a second exemplary embodiment of the optical node according to the invention.
Figure 12C:
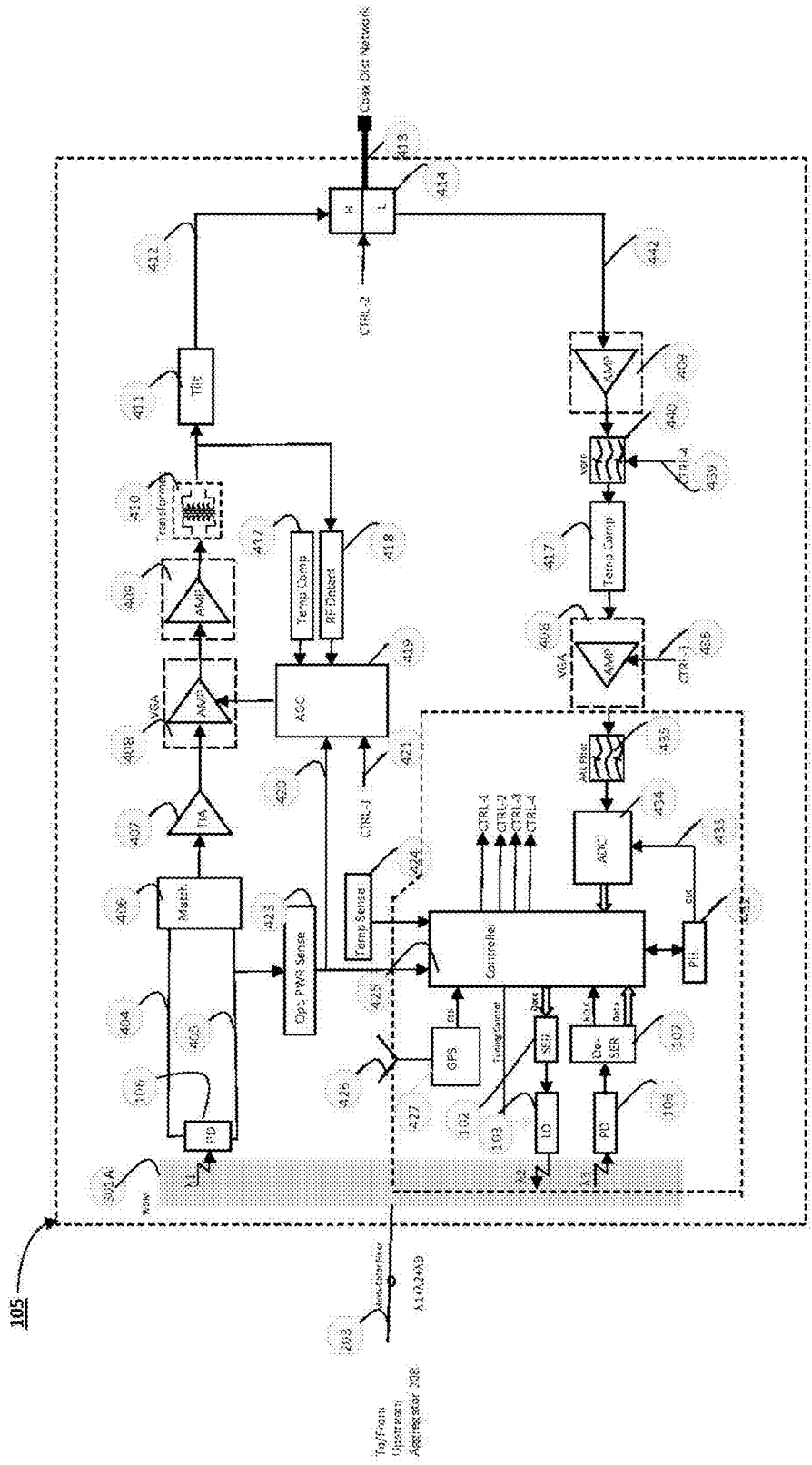
FIG. 12C illustrates a third exemplary embodiment of the optical node according to the invention.

FIGS. 12A-12C illustrate exemplary embodiments of the optical node of the system for digital aggregation of upstream traffic according to the invention.

FIG. 12A illustrates the first exemplary embodiment of the optical node according to the invention. The optical node 105 interfaces with the coax distribution network 7 through coax port 413. Diplexer 414 is a bidirectional frequency based multiplexer/demultiplexer. Coax cable 413 carries high frequency RF signals 412 toward the coax distribution network 7 and carries low frequency RF signals 442 from the coax distribution network 7 toward the optical node 105. The amplitude of the low frequency RF signal 442 is first amplified by amplifier 409 and then filtered by band pass filter 439. This process eliminates signals that are not in the desired band pass spectrum. Temperature compensation circuit 417 provides the needed adjustment to counter temperature related changes in the RF signal amplitude. Variable gain amplifier 408 is used to further increase the RF signal amplitude as needed. According to this exemplary embodiment, the anti-aliasing filter 435 restricts the RF signal bandwidth before it is sampled by analog to digital converter 434. The analog to digital converter (ADC) 434 samples the RF signal at rate of the sampling clock (CLK) 433. The digitized RF signal is then passed to controller 425 for transmission toward upstream aggregator 208.

Controller 425 receives high speed serial data and clock transmitted by the upstream aggregator 208 via WDM 301A, photo detector 106, and de-serializer 107. The data received from de-serializer 107 includes data to configure and control the on-board variable band-pass filter 439, variable gain amplifier 408, diplexer 414, and automatic gain control 419. De-serializer 107 also delivers a recovered clock (RCLK) to the controller 425. Controller 425 in turn adjusts phased locked loop (PLL) 432 and locks sampling clock (CLK) 433 to recovered clock (RCLK), thereby achieving synchronization of optical node 105 to upstream aggregator 208. ADC 434 data samples are received by controller 425, processed and sent toward upstream aggregator 208 via serializer 102 and laser diode 103.

When the optical node 105 is used according to the second exemplary embodiment of the system, as illustrated in FIG. 11A, the WDM 301A directs the optical node's corresponding wavelength, λ1, toward photo detector 106 which is further processed by matching circuit 406 and trans-impedance amplifier 407. Optical power sense circuit 423 provides controller 425 and automatic gain control 419 with measurement data that indicates optical power at the input of photo detector 106. Automatic gain control 419 also receives ambient temperature data from temperature compensation circuit 417, and data indicating RF output power from RF power detect circuit 418. AGC 419 processes the above-mentioned data and controls the variable gain amplifier 408 to achieve a pre-configured constant RF power level. RF amplifier 409 amplifies the forward RF signal further, and a passive transformer 410 adapts the RF output to a single ended signal. Tilt pre-distortion circuit 411 changes the RF signal amplitude at each frequency to counter the uneven attenuation effects encountered on coax transmission medium.

Optionally, diplexer 414 is tunable, where the frequency boundary between its high-frequency forward RF signal 412 and its low frequency upstream RF signal is adjusted by controller 425. This feature enables a single hardware platform to provide various upstream/downstream frequency split ratios. An example use of this feature is a network where a first optical node 105 can have a split ratio of 5 MHz-42 MHz for upstream RF and 54 MHz-1002 MHz for downstream RF, while a second optical node 105 in same network can have a split ratio of 5 MHz-65 MHz for upstream RF and 65 MHz-1002 MHz for downstream RF.

Optionally, band-pass filter 439 is configurable. Controller 425, through its control bus 439, configures band-pass filter 440 for a single or multiple desired frequency bands. Band-pass filter 439 in turn blocks all frequency bands that are outside the configured bands. This feature has multiple benefits, including the ability to customize ingress noise blocking profiles for each optical node 105, remotely enabling or disabling various services for each optical node 105, and supporting systems with tunable diplexers.

Optionally, optical wavelength of laser diode 103 is tunable. Controller 425 configures the optical wavelength of laser diode 103 through it tuning control signal 445. Having a tunable wavelength enables the use of the passive optical splitter 104 to connect multiple optical nodes 105 to a single WDM access span 302, as illustrated in FIG. 11B.

In order for the upstream aggregator 208 to perform digital summation of the data from the plurality of optical nodes 105, the plurality of optical nodes 105 is required to send their respective sampled data synchronously, such that they arrive at the upstream aggregator 208 at the same rate. With the first exemplary embodiment of the optical node 105, illustrated in FIG. 12A, the source of this synchronization is the sampling clock 433.

FIG. 12B illustrates a second exemplary embodiment of the optical node according to the invention. In this embodiment, the source of synchronization is a timing signal extracted from the forward signal 415. Clock detector 416 extracts a timing signal that is present in the forward signal 415 and delivers the extracted clock, also referred to as master clock 422, to the controller 425. Controller 425 locks PLL 432 to master clock 422, thereby synchronizing the sampling clock 433 to the original timing source present in the forward signal. This embodiment enables the plurality of optical nodes 105 to be synchronized to a central timing source that is present in the forward signal.

FIG. 12C illustrates a third exemplary embodiment of the optical node according to the invention. In this embodiment, the source of synchronization is a clock source extracted from a GPS system. GPS receiver 427 receives a GPS signal through the antenna 426, processes the GPS data, and extracts a GPS clock. Controller 425 locks the PLL 432 to the GPS clock, thereby synchronizing the sampling clock 433 to the GPS timing system.

Figure 13:
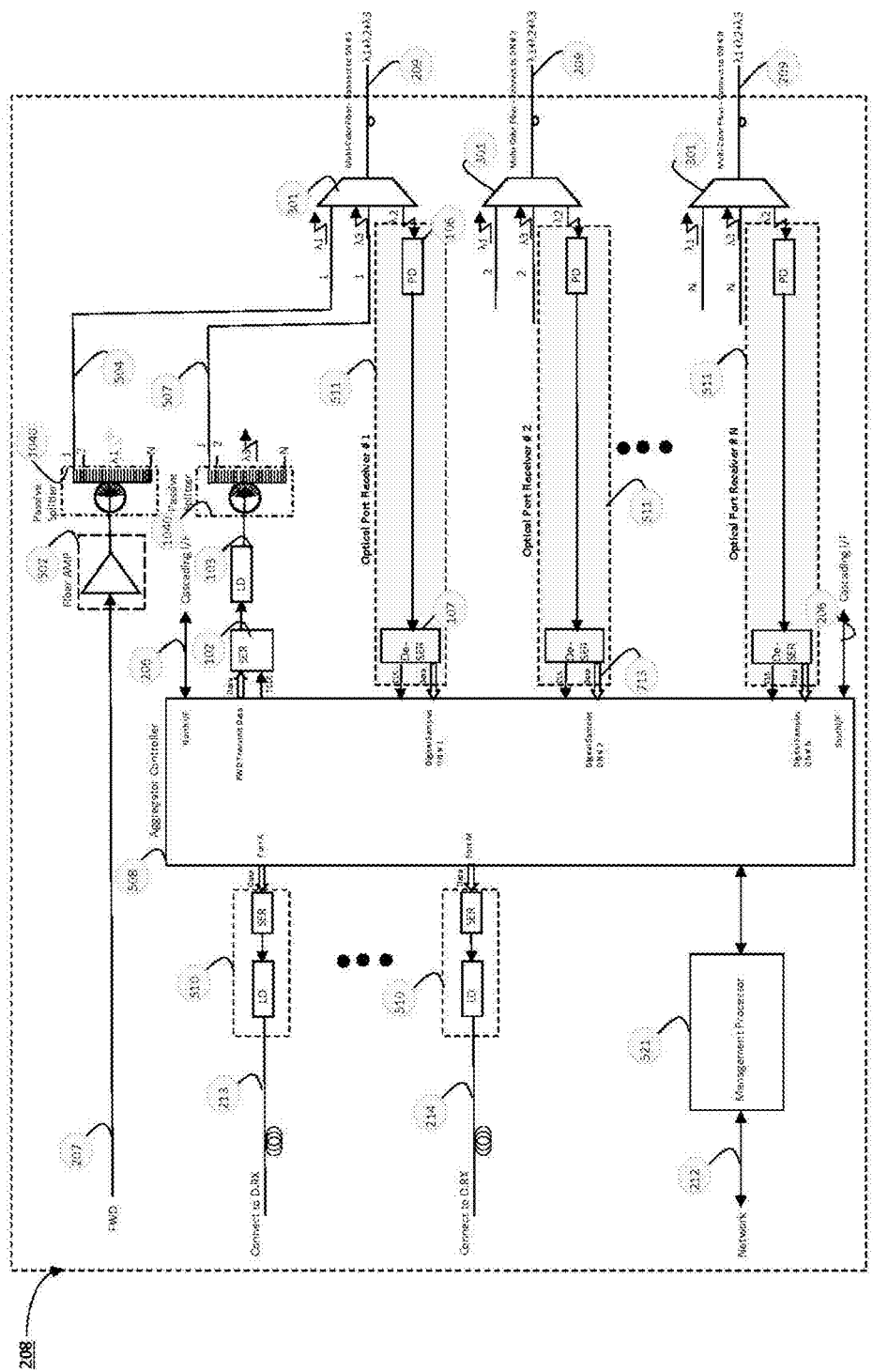
FIG. 13 illustrates a first exemplary embodiment of the upstream aggregator 208 according to the invention.
Figure 14:
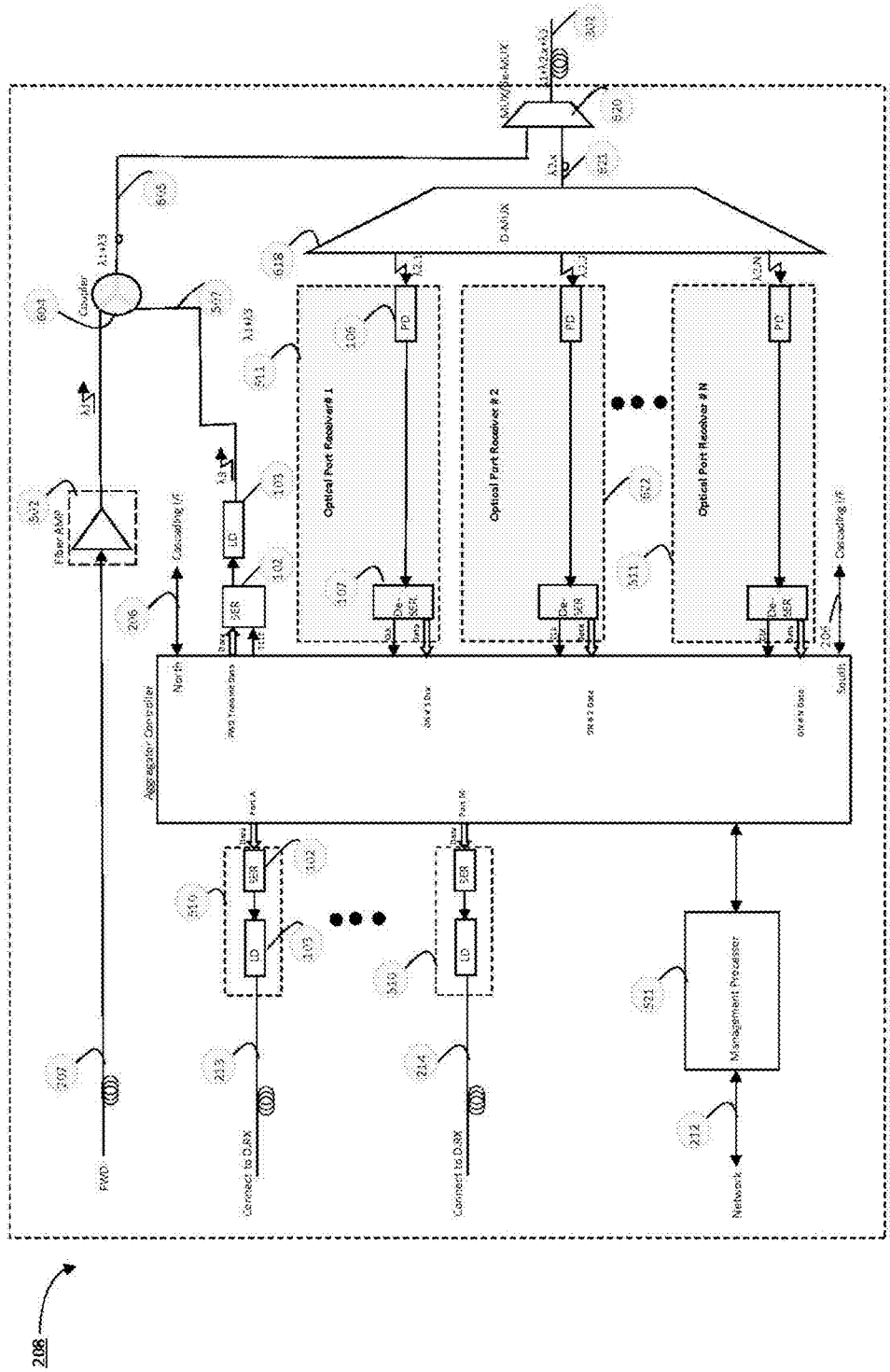
FIG. 14 illustrates a second exemplary embodiment of the upstream aggregator 208 according to the invention.

FIGS. 13-14 illustrate exemplary embodiments of the upstream aggregator 208 of the system for digital aggregation of traffic according to the invention.

FIG. 13 illustrates a first exemplary embodiment of the upstream aggregator 208 according to the invention. The first exemplary embodiment corresponds to the upstream aggregation system illustrated in FIGS. 10A-10B. In this embodiment, each wavelength division multiplexer/de-multiplexer 301 connects to an optical node 105 of the plurality of optical nodes through each optical node's corresponding span 209. Each span 209 carries three types of data, each on a different wavelength designated as λ1, λ2 and λ3. Wavelength λ1 carries forward RF signal 207 toward the optical node 105, wavelength λ2 carries digital data that includes digitized upstream RF signal 114 (see FIG. 10A) and management data, and wavelength λ3 carries control and clock data to the optical node 105.

Aggregation controller 508 transmits its control data and clock to serializer 102. Serializer 102 converts the data into a serial format with a rate defined by the aggregation controller 508 transmit clock signal (TCLK). The serial data from serializer 102 is converted to WDM λ3 by laser diode 103. Passive splitter 1040 then performs power splitting of the WDM serial data, resulting in multiple digital forward signals 507. Digital forward signal 507 is used by the plurality of optical nodes 105 as a source for management data, configuration data, and synchronization.

Optical port receiver 511, comprising photo detector 106 and de-serializer 107, converts WDM data λ2 to data bus for the aggregation controller 508. This data bus contains digitized upstream RF signal 114 (see FIG. 10A) and management data. Management data is sent for further processing to management processor 521. The digitized upstream data 713 is further processed by the aggregation controller 508.

The processed digital upstream data from the plurality of optical nodes 105 is then transmitted by the aggregation controller 508 through serial transmitter 510 over span 213. Multiple serial transmitters 510 ports can be used for port redundancy or load sharing across the number of ports.

Management processor 521 connects to central management server (not shown) through management link 212. Management processor 521 receives control data, configuration data, and status update request data from management link 212, and stores the various type of data types in its memory. Management processor 521 uses its stored data to configure registers and various functions residing in aggregation controller 508, Management processor 521 communicates with the plurality of connected optical node 105 through the aggregation controller 508. This communication is used for configuration, control, and status updates of facilities in the plurality of optical nodes 105.

Forward signal 207, having wavelength of λ1 and provided by an external system (not shown), is further amplified by fiber amplifier 502 and then split N-ways by passive splitter 1040, resulting in N number of identical RF optical forward signals 504. The RF optical forward signals 504 are then connected to the plurality of WDM multiplexer/de-multiplexer 301.

FIG. 14 illustrates a second exemplary embodiment of the upstream aggregator 208 according to the invention. This second exemplary embodiment corresponds to the upstream aggregation system illustrated in FIGS. 11A-11B. In this embodiment, upstream aggregator 208 connects with tunable wavelength-type optical nodes 105. The tunable wavelength-type optical nodes 105 communicate with the upstream aggregator 208 through a single WDM access span 302. WDM multiplexer/de-multiplexer (Mux/D-Mux) 620 diverts several wavelengths, designated as λ2.1-λ2.N, from WDM access span 302 to the WDM de-multiplexer 618. In parallel, the WDM Mux/D-Mux 620 directs wavelengths λ1+λ3, representing the combined RF and Digital Forward signals 605, toward the WDM access span 302.

WDM de-multiplexer 618 receives multiple digital upstream signals, each on a different wavelength (λ2.1 through λ2.N), on its WDM upstream optical signal 621. Each of the combined λ2.1 through λ2.N wavelengths are then de-multiplexed and directed toward the appropriate optical port receiver 511.

Figure 15A:
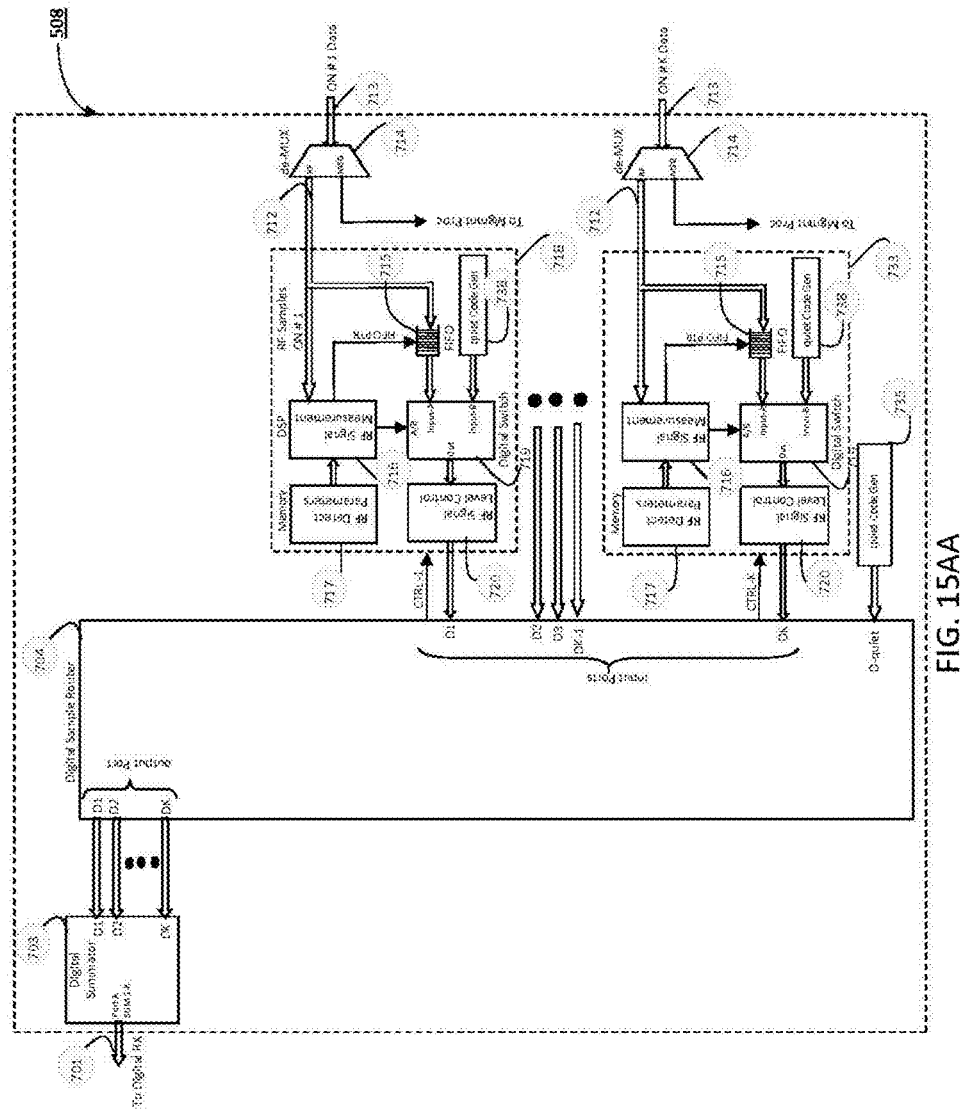
FIG. 15AA illustrates a first exemplary embodiment of the aggregation controller 508 according to the invention.
Figure 15A:
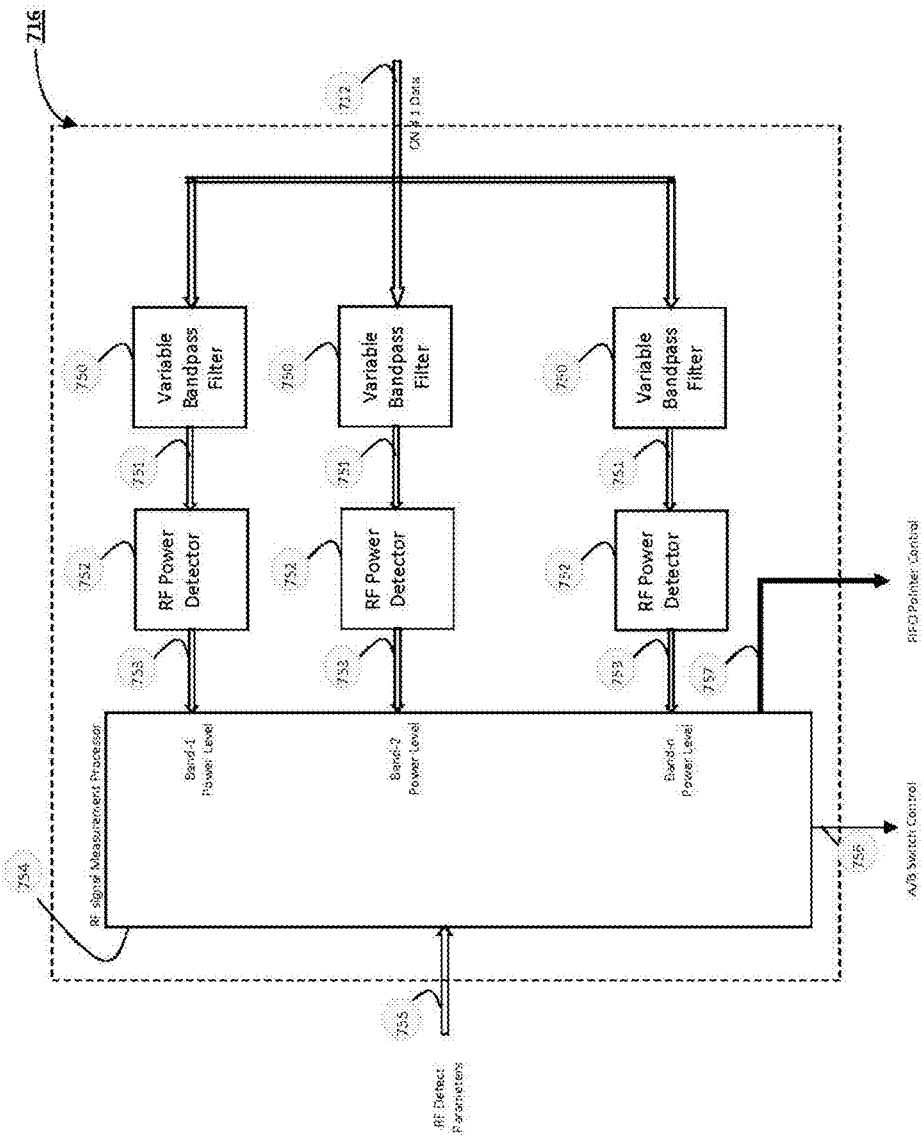
Figure 15A:
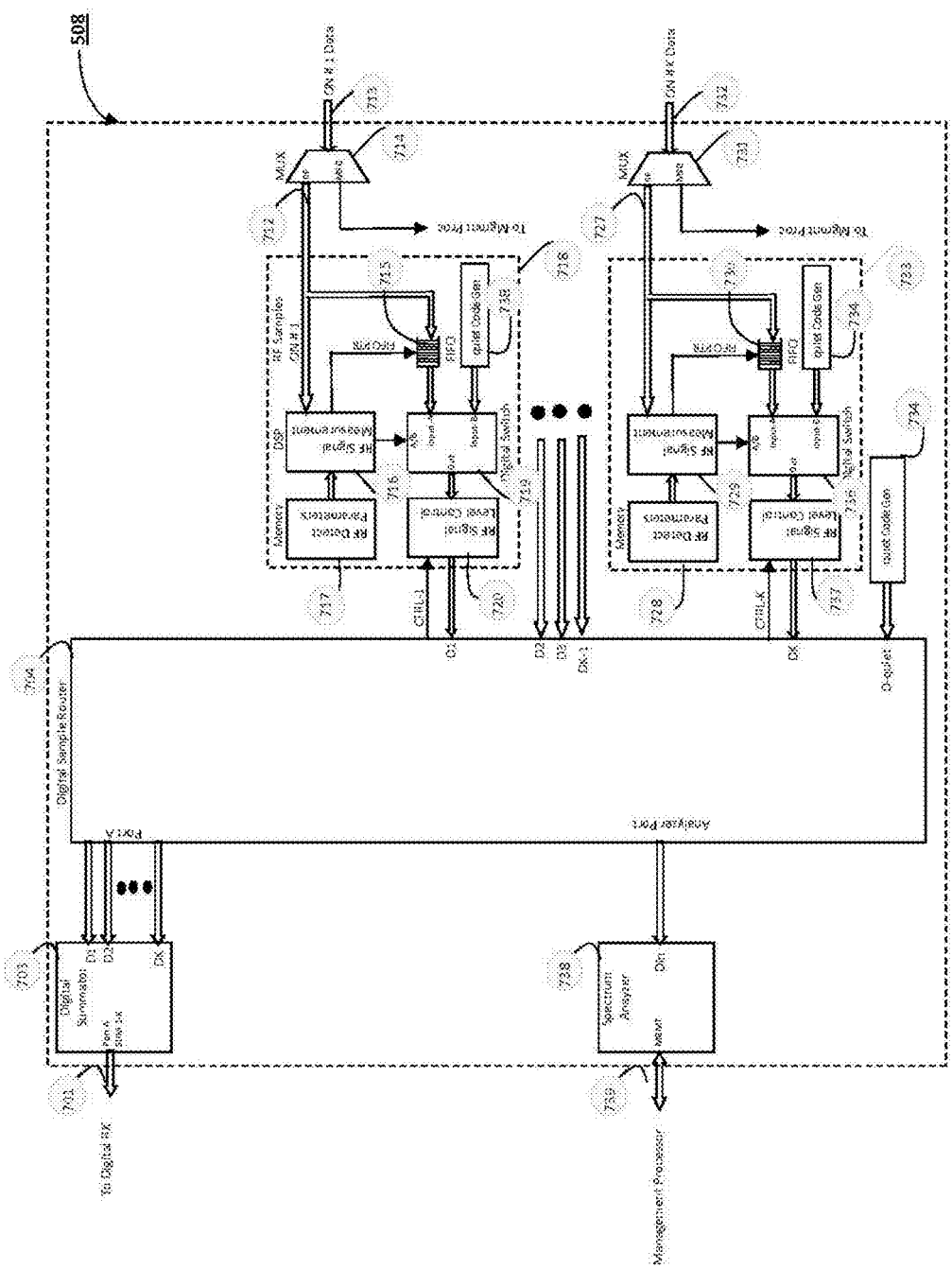
Figure 15A:
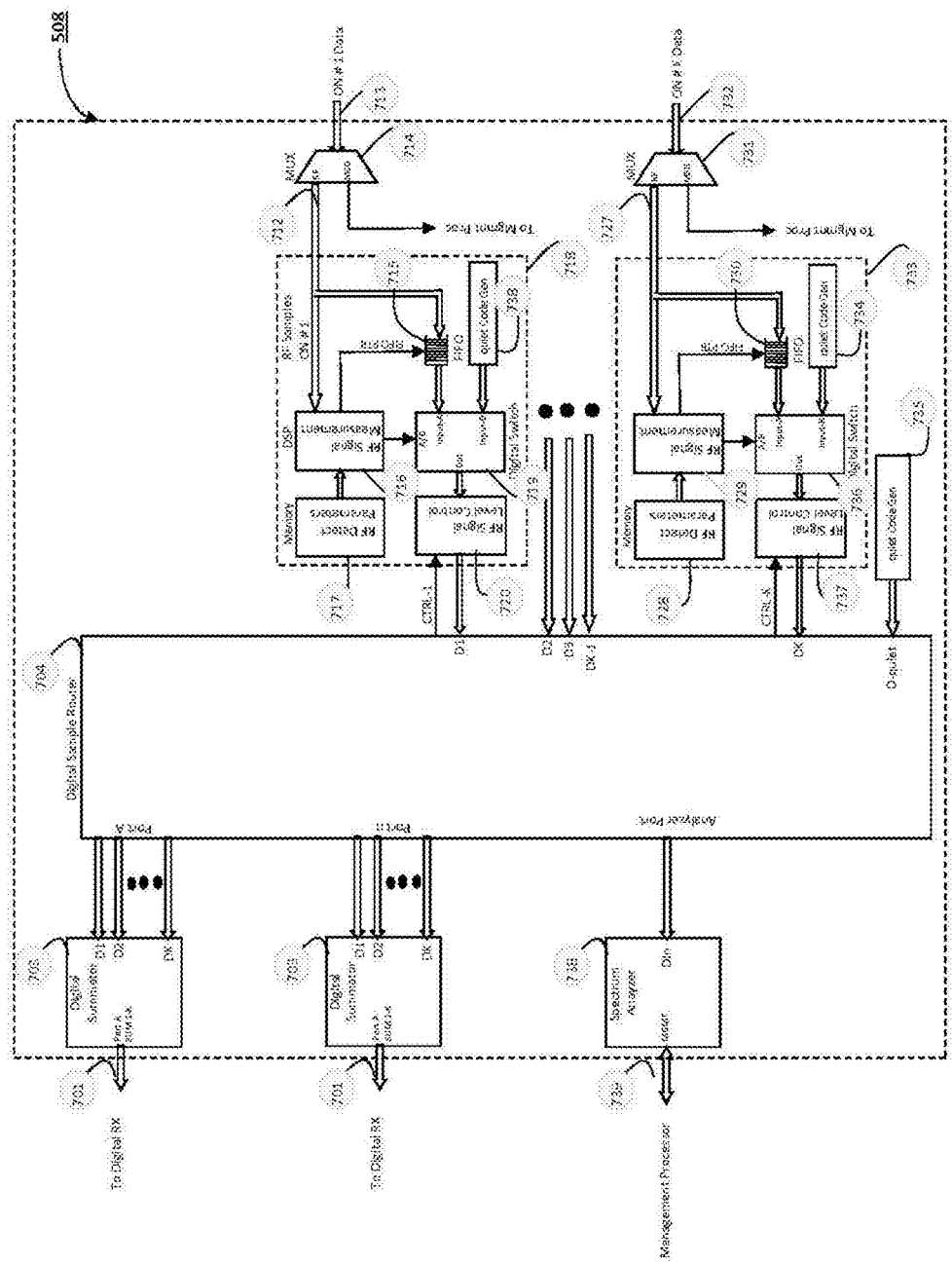

FIGS. 15AA-16C illustrate exemplary embodiments of the aggregation controller 508 of the upstream aggregator 208 according to the invention.

FIG. 15AA illustrates a first exemplary embodiment of the aggregation controller 508 according to the invention. De-multiplexer 714 receives digitized upstream data 713 from the optical port receivers 511 (see FIG. 13) and segregates the different data types. Digitized RF data 712 is sent to burst processor 718 for further processing, while management related data and other non-RF data are sent to management processor 521 (see FIG. 13).

Burst processor 718 receives the digitized RF data 712 and simultaneously stores the received data in its First-In-First-Out (FIFO) 715 memory and measures the RF signal power 716 present in the digitized RF data 712 by the digital signal processor (DSP) 716. RF detect parameters 717 are configured by management processor 521 through control bus-1 (CTRL-1). The configured detection may include, but are not limited to, any combination of the following parameters:

Minimum& maximum RF burst duration
RF burst power thresholds & hysteresis levels in absolute values as well as relative to average RF signal power
list of in-band frequencies
list of out-of-band frequencies
RF burst ram-up & ramp-down profiles (amplitude versus time)
Start of RF Burst Negative delay RF signal measurement DSP 716 continues processing the digitized RF data by comparing measured parameters against parameters stored by RF detect parameter memory 717 and outputting control signals for FIFO 715 and digital switch 719. Input port A of the digital switch 719 is connected directly to the FIFO 715 output, and input port B of the digital switch 719 is connected to the quiet code generator 738. RF signal measurement DSP 716 selects between RF data samples stored in FIFO 715 or quiet code by operating the A/B signal which is connected to the digital switch 719. The output of the digital switch 719 is further processed by RF signal level control 720, which adjusts the power of the RF signal based on parameters received through the control bus (CTRL-K). RF signal level control 720 enables the adjustment of RF signal for each of the plurality of optical nodes. This capability can be used to achieve uniform RF signal levels in large systems, enabling or disabling service to a single or group of optical nodes 105, and/or help identify a particular optical node 105 that may be contributing undesirable ingress noise into the system.

Several burst processors 718 and also a quiet code generator 735 are connected to a single digital sample router 704. Digital sample router 704 established semi static connections between any of its input ports to any of its output ports based on configuration received from management processor 521. For active optical nodes 105, their respective input ports on digital sample router 704 are connected to their respective output ports. For inactive optical node 105, their respective output ports on digital sample router 704 are connected to the D-Quiet input port, thereby not contributing any RF data for further processing by digital summator 703.

Digital summator 703 receives multiple streams of RF data samples provided by digital sample router 704 and performs digital summing of the samples received from its input ports. The output of digital summator 703 is a single aggregated digital upstream data 701, which includes the sum data and carryover data components of the binary summing process.

FIG. 15AB illustrates an exemplary embodiment of the RF Signal Power Measurement 716 of the aggregation controller 508 according to the invention. Digital RF sample data 712 is processed by a bank of variable band pass filters 750. Each band pass filter 750 is configured by the management processor 521 (see FIG. 10A) to a desired frequency band over which a burst of RF data is expected. The resulting filtered RF data 751 is then further processed by RF power detectors 752. RF power detectors 752 continuously measure the RF power levels present in the signal and provide the RF signal measurement processor 754 with digital values of RF power level 753.

RF signal measurement processor 754 continuously processes the digital values of RF power level 753, compares the data with detection parameters provided over the RF detect parameters 755, and outputs control signals including the A/B switch control 756 and the FIFO pointer control over the FIFO control bus 757. The A/B switch control 756 is set to an "A" state when the RF signal measurement processor 754 detects a valid RF burst and is set to a "B" state when a valid RF burst is not detected on any of the active frequency bands.

RF signal measurement processor 754 processes the digital values of RF power level 753 and dynamically calculates and stores a variable in its memory representing average RF signal power. This update takes place only during detection of valid RF burst.

RF signal measurement processor 754 processes the digital values of RF power level 753 and compares the measured results with pre-configured values for valid burst ramp up profile, valid RF burst ramp down profile, RF burst power threshold values, hysteresis values, minimum valid RF burst duration, and maximum valid burst duration. Once the RF signal measurement processor 754 detects a valid RF burst, the RF signal measurement processor 754 switches the A/B switch control 754 to the "A" state, compensates for time delay that resulted from the various RF burst processing stages, and adjusts the FIFO pointer control bus 757 to point to the FIFO memory location where the actual start of the RF burst is stored. RF signal measurement processor 754 further adjusts the FIFO pointer to account for the start of the RF burst portion that is below the detection threshold and is pre-configured by management processor 521 as a start of the RF burst negative delay. By adjusting the FIFO pointer with these two parameters, the system eliminates any loss of RF burst data which typically is used to transmit preamble information.

FIG. 15AC illustrates a second exemplary embodiment of the aggregation controller 508 according to the invention. In this embodiment, in addition to the components described above with reference to FIG. 15AA, a spectrum analyzer 738 is receiving digitized RF samples from any of the selected input ports. Management processor 521 configures the digital sample router 704 and forwards digital samples from one of its input port associated with a selected optical node 105 to be analyzed. The digital sample router 704 then sends data samples from its selected input port to a number of output ports (multicast), including the output port connecting to digital summator 703, and to the spectrum analyzer 738. Spectrum analyzer 738 then processes the digital RF data and sends the management processor 521 data that includes tables of RF signal amplitude at each selected frequency band. Management processor 521 configures various parameters controlling the operation of the spectrum analyzer 738. These parameters include variables such as frequency band, center frequency, video bandwidth, IF bandwidth, scan rate, scan bandwidth, RF attenuator and IF gain reference level.

Management processor 521 may employ the spectrum analyzer 738 in a manual mode or on an automatic mode. In manual mode, the spectrum analyzer 738 and digital sample router 704 are configured to scan data from a single selected RF port. In automatic mode, the spectrum analyzer 738 and digital sample router 704 are configured to scan data all RF ports, such as one at a time in round robin fashion. The data collected during the "automatic" mode may be stored by the management processor 521 for analysis at a later time.

The data collected from spectrum analyzer 738 then can be used to adjust RF signal gain stages at each optical node 105 or at the upstream aggregator 208, thus achieving uniform RF signal levels across a large system. The same data can be used to identify sources of ingress noise, which can be remedied by adjusting the bandpass filters at the optical node 105 or bandpass filters at the upstream aggregator 208.

FIG. 15AD illustrates a third exemplary embodiment of the aggregation controller 508 according to the invention. In this embodiment, in addition to the components described above with reference to FIG. 15AA, multiple digital summators 703 are connected to the digital sample router 704. Management processor 521 configures the digital sample router 704 to route a specific group of RF input ports to each digital summator 703. In turn, each digital summator 703 receives multiple streams of RF data samples provided by digital sample router 704, performs digital summing of the samples received from its input ports, and outputs a single aggregated digital upstream data 701. This embodiment allows RF data load sharing across multiple aggregated digital upstream data 701 links. Also, this embodiment can be used to provide a certain level of redundancy.

Figure 15B:
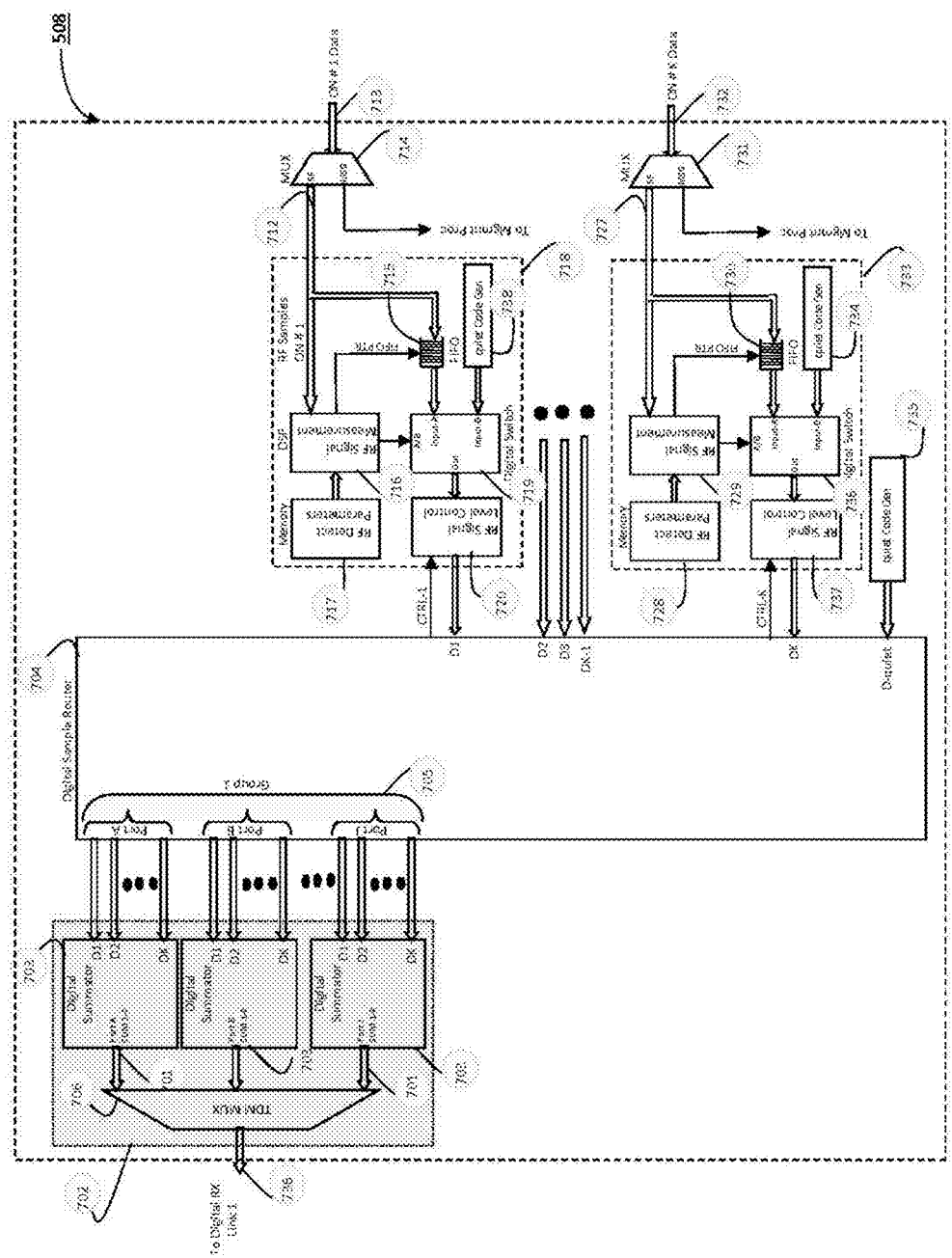
FIG. 15B illustrates a fourth exemplary embodiment of the aggregation controller 508 according to the invention.

FIG. 15B illustrates a fourth exemplary embodiment of the aggregation controller 508 according to the invention. In this embodiment, in addition to the components described above with reference to FIG. 15AA, multiple aggregated digital upstream data links 701 are connected to a time division multiplexer (TDM MUX) 706. The TDM MUX 706 time-multiplexes multiple aggregated digital upstream data links 701 and outputs a much higher speed TDM aggregated digital upstream data links 736. This embodiment improves the utilization of the span connecting the upstream aggregator 208 and the digital receiver 108.

Figure 15C:
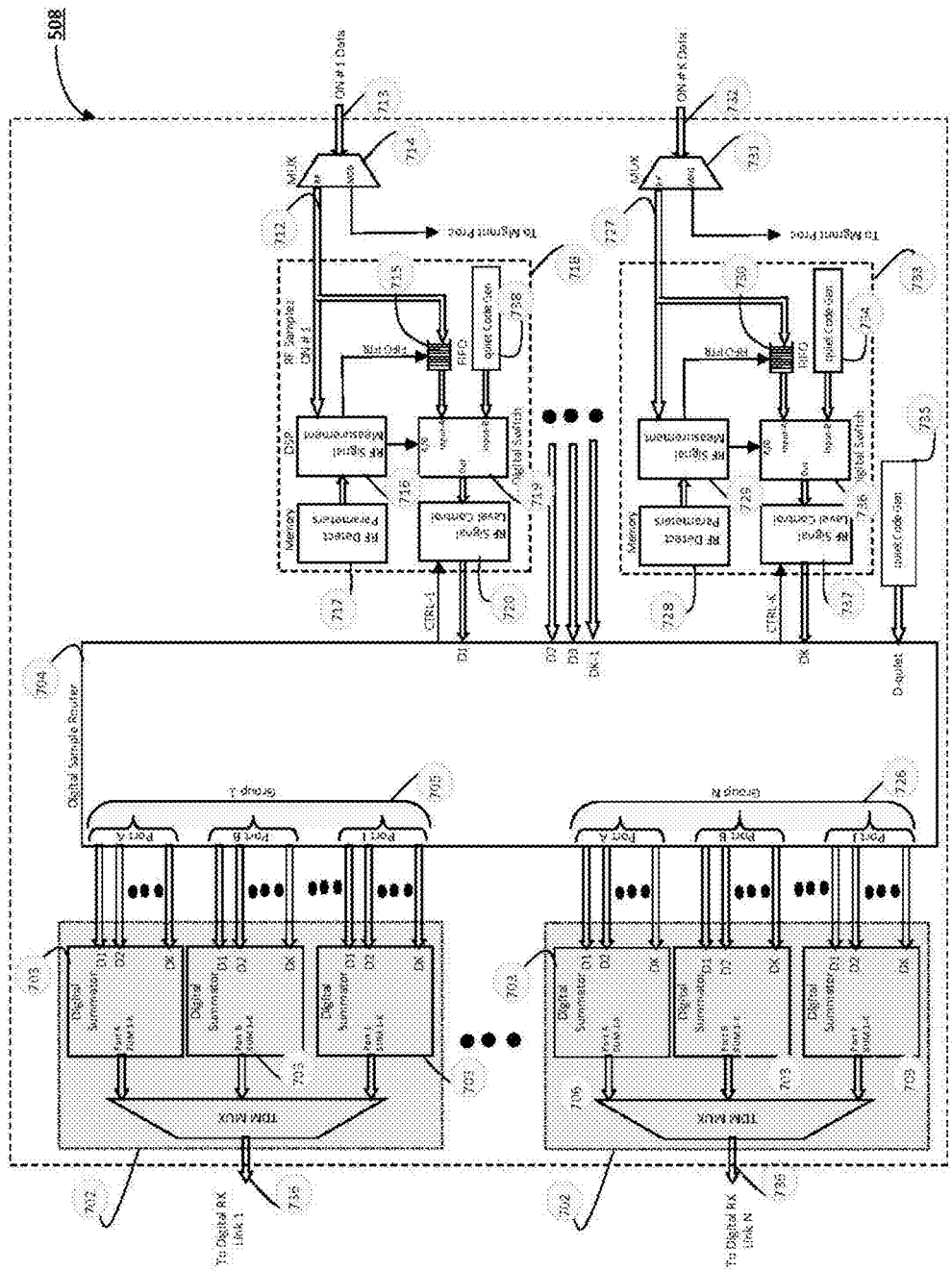
FIG. 15C illustrates a fifth exemplary embodiment of the aggregation controller 508 according to the invention.

FIG. 15C illustrates a fifth exemplary embodiment of the aggregation controller 508 according to the invention. In this embodiment, in addition to the components described above with referenced to FIG. 15B, multiple upstream digital RF TDM multiplexers 702 are connected to the same digital sample router 704. Management processor 521 configures the digital sample routers 704 in the manner described above. This embodiment allows RF data load sharing across multiple TDM aggregated digital upstream data 736 links. Also, this embodiment can be used to provide a certain level of redundancy.

Figure 16A:
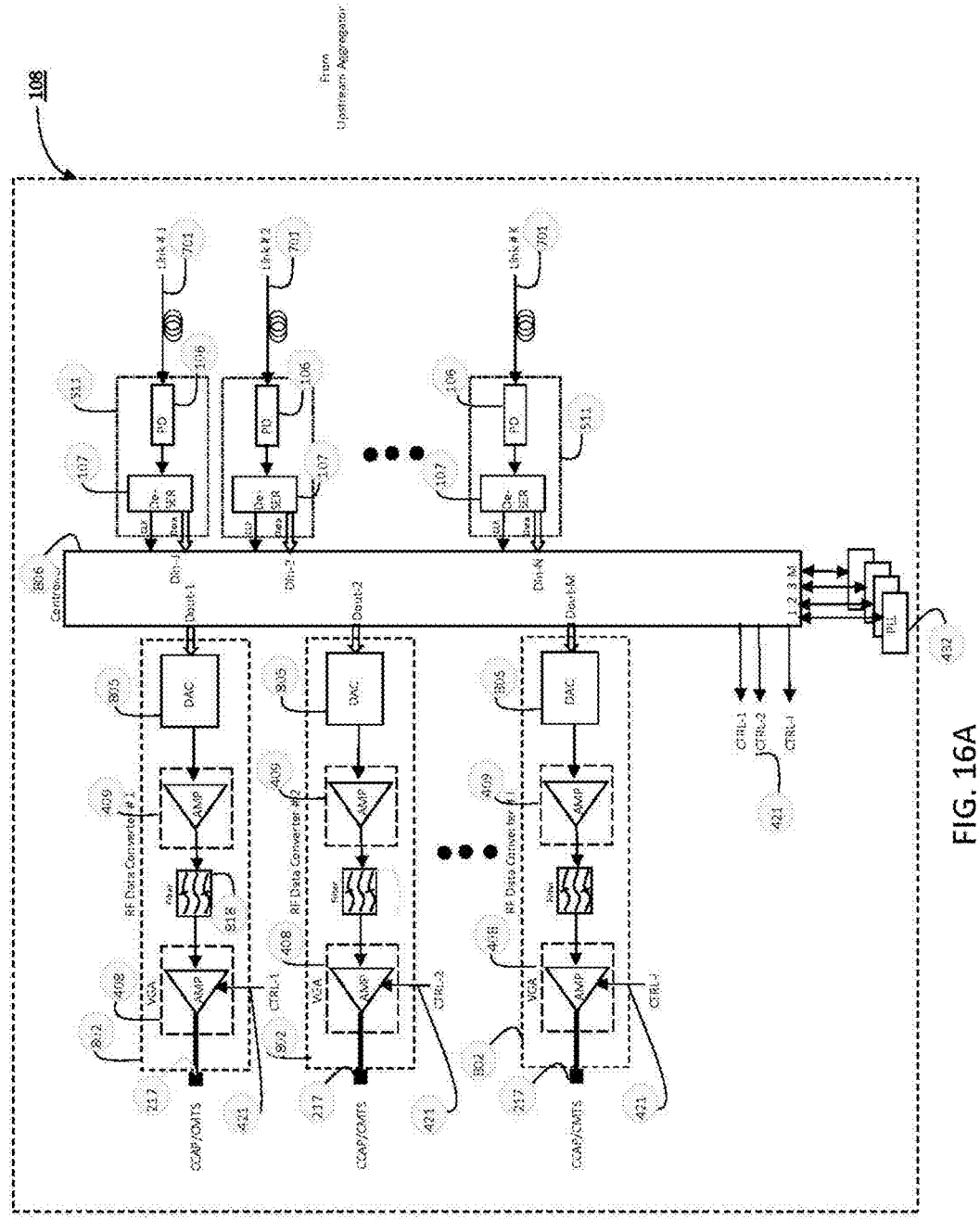
FIG. 16A illustrates a first exemplary embodiment of the digital receiver 108 according to the invention.

FIGS. 16A and 16C illustrate exemplary embodiments of the digital receiver 108 of the system for digital aggregation of traffic according to the invention.

FIG. 16A illustrates a first exemplary embodiment of the digital receiver 108 according to the invention. Aggregated digital upstream data 701 is received by photo diode 106, converted to digital data stream and handed over to de-serializer 107. De-serializer 107 converts the serial format data into a parallel format data and provides the upstream digital receiver controller 806 with clock and data signals. Upstream digital receiver controller 806 adjusts the PLL 432 continually to achieve synchronization to the clock signal provided by de-serializer 107.

Upstream digital receiver controller 806 further processes the received data and outputs the processed data to digital to analog converter (DAC) 805, which converts the processed data into analog RF format. RF amplifier 409 amplifies the amplitude of the analog RF signal and passes the analog RF signal through the RF filter 818 to remove unwanted RF spectrum that resulted from the analog to digital & digital to analog conversion process. Variable RF amplifier 408 amplifies the RF output 217 to a level that is controlled by control signal CTRL-1.

Optionally, the digital receiver 108 may comprise multiple optical receivers 511, multiple PLL 432 and multiple RF data converter 802, as illustrated. Each of the upstream digital receiver controller 806 performs tasks in the manner described above.

Figure 16B:
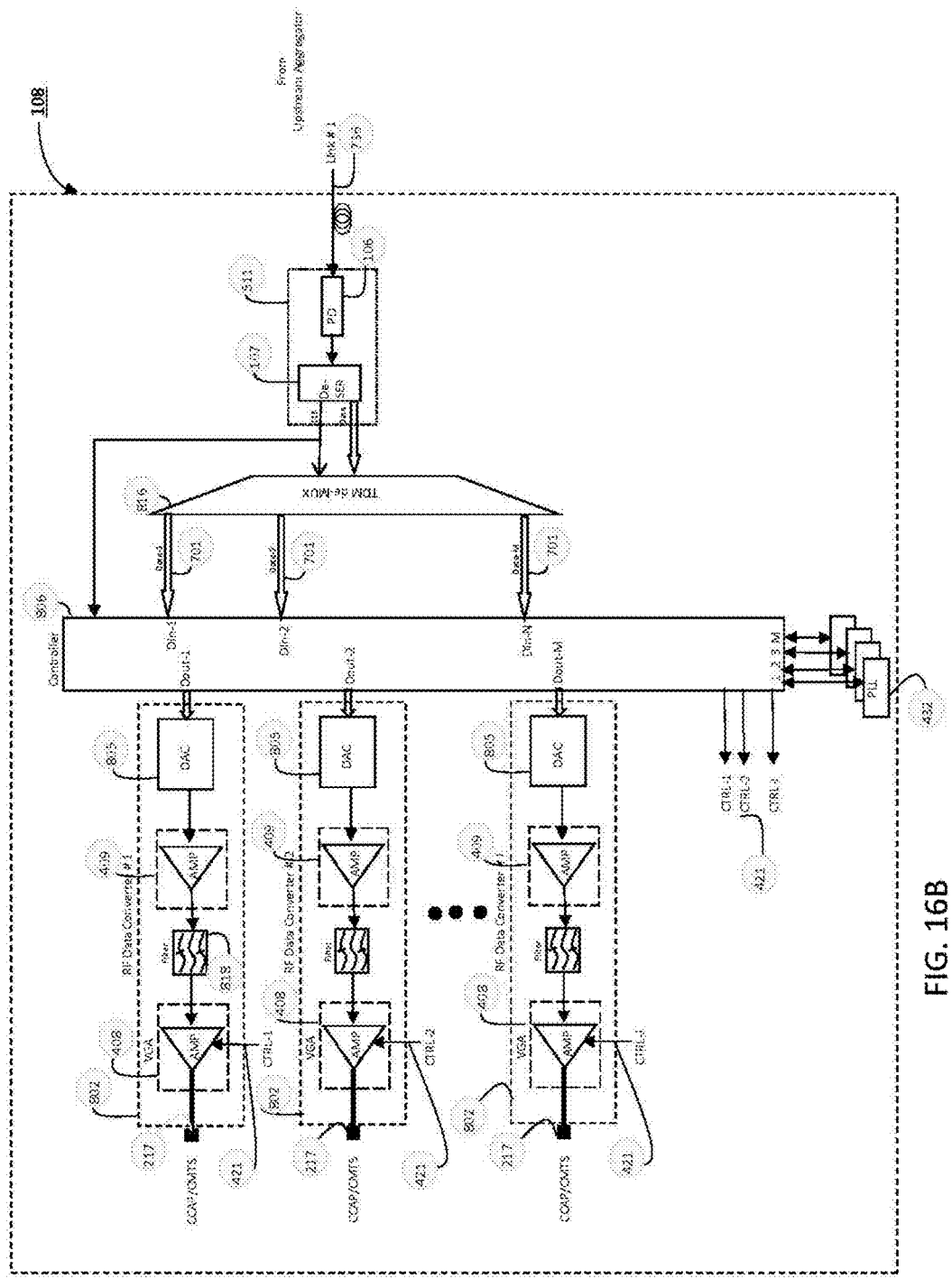
FIG. 16B illustrates a second exemplary embodiment of the digital receiver 108 according to the invention.

FIG. 16B illustrates a second exemplary embodiment of the digital receiver 108 according to the invention. This embodiment of the digital receiver 108 corresponds to the aggregation controller 580 described above with reference to FIG. 15B. The TDM aggregated digital upstream data 736 connects to optical receiver 511 and outputs clock and data signals. The TDM de-multiplexer 816 processes the data, de-multiplexes the data, and outputs multiple groups of aggregated digital upstream data 701 to the upstream digital receiver controller 806. The upstream digital receiver controller 806 and the RF data converter 802 performs the data processing in the same manner as described above with reference to FIG. 16A.

Embodiments of a system for digital aggregation of upstream traffic according to the invention has been described. The various embodiments of the invention address the problems and disadvantages of existing daisy chaining techniques as follows.

Single point of failure. As illustrated in at least FIG. 10A, each optical node 105 connects to a dedicated port of the upstream aggregator 208, thereby eliminating the chance of one failed optical node affecting the operation of other connected optical nodes.

Complicated Management. As illustrated in at least FIGS. 10A and 10B, each optical node 105 directly communicates with the upstream aggregator 208 bidirectionally. This arrangement provides a straightforward way for the upstream aggregator 208 to communicate directly with each connected optical node 105, detect their presence, send commands to the optical nodes 105 directly, and receive status information from the optical nodes 105 directly.

Noise Funneling. As illustrated in at least FIG. 15AA, the optical nodes 105 transmit their respective digital samples of their upstream signal continuously to the upstream aggregator 208, where these samples are processed. The upstream aggregator 208, by employing digital sample processing, detects the RF bursts. The upstream aggregator 208 sends valid RF samples to the digital summator 703 only during valid RF burst period and sends Quiet Code 738 at all other times. This eliminates noise floor funneling since during non-burst periods, only quiet codes are sent to the digital summator 703.

The various embodiments of the invention address the problems and disadvantages of existing RFoG techniques as follows.

Loss of Preamble. As illustrated in at least FIG. 15AA-15AB, digital samples representing upstream RF data samples are stored in FIFO 715, while "RF signal Measurement" (716) continuously processes the incoming samples. Upon detection of a valid RF burst, RF signal measurement 716 updates the FIFO pointer 757 to point to the correct samples that represent truly the beginning of the RF burst. The RF signal measurement 716 also switches the digital switch 719 to its "input-A" port, thereby sending digital samples to the digital summator 703 that represents the true start of the RF burst, therefore eliminating any loss of the preamble portion of the RF burst.

Limited Number of Optical Nodes. As illustrated in at least FIGS. 10A-10B, 11A-11B, and 12A-12C, the optical nodes 105 communicate with the upstream aggregator 208 bidirectionally over dedicated optical spans using a digital protocol. Since the optical nodes 105 communication with the upstream aggregator 208 are digital and non-bursty, the continuous stream of upstream RF digital samples are transmitted by the optical nodes 105 and received by the upstream aggregator 208. The lasers in the optical nodes 105 are modulated according to digital protocols and therefore the "off state" does not have any effect on the RF sample noise floor.

Upstream Link Performance. As illustrated in at least FIGS. 10A-10B, 11A-11B, and FIGS. 12A-12C, the communications between the optical nodes 105 and the upstream aggregator 208 are digital. Upstream RF samples traversing the optical fiber link between the upstream aggregator 208 and the optical nodes 105 are organized into digital bit streams that are easily received and stored by the upstream aggregator 208 input ports. As opposed to AM modulated analog optical links, digital optical links have much higher tolerance for link parameter variations as a results of temperature changes, link distances variations or laser analog performance.

Optical Beating Interference. As illustrated in at least FIGS. 10A-10B, 11A-11B, and FIGS. 12A-12C, the optical nodes 105 communicate with the upstream aggregator 208 bidirectionally over dedicated optical spans using a digital protocol. Thus, there is no opportunity for the optical signals from different optical nodes to interfere with each other.

Lack of Management Facilities. As illustrated in at least FIGS. 10A-10B, 11A-11B, and FIGS. 12A-12C, the optical nodes 105 communicate with the upstream aggregator 208 bidirectionally over dedicated optical spans using a digital protocol. Every optical node 105 directly communicates with the upstream aggregator 208 bidirectionally. This allows a straightforward way for the upstream aggregator 208 to communicates directly with each connected optical node 105, detect the presence of each optical node 105, send commands to the optical nodes 105 directly, and receive status information from the optical nodes 105 directly. Communication channels are allocated between the optical nodes 105 and the upstream aggregator 208 to facilitate the transmission of commands, configurations and parameters, and status information bidirectionally.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for digital aggregation of upstream traffic in a network, comprising:
   a plurality of optical nodes coupled to a customer distribution network, each optical node of the plurality of optical nodes:
      receives a transmit clock signal from an upstream aggregator;
      locks a sampling clock to the transmit clock signal;
      samples corresponding upstream radio frequency (RF) data at a rate of the sampling clock; and
      converts the sampled upstream RF data to serial digital data;
   a plurality of dedicated optical fiber spans coupled to the plurality of optical nodes, wherein the plurality of optical nodes is directly coupled in parallel to the upstream aggregator via the plurality of dedicated optical fiber spans, wherein each optical node of the plurality of optical nodes is assigned a dedicated optical fiber span of the plurality of dedicated optical fiber spans;
   the upstream aggregator coupled to each of the plurality of dedicated optical fiber spans, wherein the upstream aggregator:
      sends the transmit clock signal generated by the upstream aggregator to each of the plurality of optical nodes;
      receives the serial digital data from each of the plurality of optical nodes over each of the plurality of dedicated optical fiber spans assigned to each of the plurality of optical nodes;
      aggregates the serial digital data received from each of the plurality of optical nodes; and
      outputs the aggregated serial digital data; and
   a digital receiver residing at a head end and coupled to the upstream aggregator, wherein the digital receiver:
      receives the aggregated serial digital data from the upstream aggregator;
      converts the aggregated serial digital data to RF data; and
      outputs the RF data to the network.

2. The system of claim 1, further comprising:
   a passive splitter coupled to the plurality of dedicated optical fiber spans, wherein the plurality of optical nodes is directly coupled in parallel to the passive splitter via the plurality of dedicated optical fiber spans;
   a single wavelength division multiplexing (WDM) access fiber coupled to the passive splitter; and
   a wavelength division multiplexer and de-multiplexer (WDM Mux/De-Mux) coupled to the passive splitter via the single WDM access fiber and to the upstream aggregator.

3. The system of claim 1, further comprising:
   a second plurality of optical nodes coupled to the customer distribution network, each optical node of the second plurality of optical nodes samples corresponding upstream RF data and converts the sampled upstream RF data to serial digital data;

a second plurality of dedicated optical fiber spans coupled to the second plurality of optical nodes, wherein each optical node of the second plurality of optical nodes is assigned a dedicated optional fiber span of the second plurality of optical fiber spans;

a cascading bus coupled to the upstream aggregator and a second upstream aggregator;

the second upstream aggregator coupled to each of the second plurality of dedicated optical fiber spans, wherein the second upstream aggregator:

receives the second serial digital data from each of the second plurality of optical nodes over each of the second plurality of dedicated optical fiber spans assigned to each of the second plurality of optical nodes;

aggregates the second serial digital data received from each of the second plurality of optical nodes; and outputs the aggregated second serial digital data to the upstream aggregator via the cascading bus, wherein the upstream aggregator further aggregates the aggregated second serial digital data with the aggregated serial digital data.

4. The system of claim 1, wherein each of the plurality of nodes are configured to function on a same wavelength.

5. The system of claim 1, wherein each of the plurality of nodes are configured to function on a different wavelength.

6. The system of claim 1, wherein at least one of a given optical node of the plurality of optical nodes comprises:

an analog to digital converter to sample given upstream RF data at a rate of the sampling clock.

7. The system of claim 1, wherein the upstream aggregator comprises:

one or more wavelength division multiplexer/de-multiplexers (Mux/D-Mux) coupled to the plurality of optical nodes;

a plurality of optical port receivers coupled to the one or more Mux/D-Mux to receive the serial digital data from the plurality of optical nodes; and an aggregation controller coupled to the plurality of optical port receivers, wherein the aggregation controller receives and processes the serial digital data from the plurality of optical port receivers.

8. A system for digital aggregation of upstream traffic in a network, comprising:

a plurality of optical nodes coupled to a customer distribution network, each optical node of the plurality of optical nodes samples corresponding upstream radio frequency (RF) data and converts the sampled upstream RF data to serial digital data;

a plurality of dedicated optical fiber spans coupled to the plurality of optical nodes, wherein each optical node of the plurality of optical nodes is assigned a dedicated optical fiber span of the plurality of dedicated optical fiber spans;

an upstream aggregator is coupled to each of the plurality of dedicated optical fiber spans, wherein the upstream aggregator:

receives the serial digital data from each of the plurality of optical nodes over each of the plurality of dedicated optical fiber spans assigned to each of the plurality of optical nodes, aggregates the serial digital data received from each of the plurality of optical nodes, and outputs the aggregated serial digital data, wherein the upstream aggregator comprises:

one or more wavelength division multiplexer/de-multiplexers (Mux/D-Mux) coupled to the plurality of optical nodes, a plurality of optical port receivers coupled to the one or more Mux/D-Mux to receive the serial digital data from the plurality of optical nodes, and an aggregation controller coupled to the plurality of optical port receivers, wherein the aggregation controller receives and processes the serial digital data from the plurality of optical port receivers, wherein the aggregation controller comprises:

a plurality of burst processors coupled to the one or more Mux/D-Mux to receive the serial digital data from the plurality of optical nodes and to store the serial digital data in a First-In-First-Out (FIFO) memory, a digital sample router coupled to a plurality of output ports of the plurality of burst processors, a quiet code generator coupled to a D-quiet port of the digital sample router, and one or more digital summators coupled to one or more output ports of the digital sample router, wherein for each inactive optical node of the plurality of optical nodes, an output port of the inactive optical node is coupled to the D-quiet port of the digital sample router, wherein no serial digital data from the inactive optical node is sent to the digital summator, wherein for each active optical node of the plurality of optical nodes, an output port of the active optical node is coupled to a corresponding input port of the digital sample router; and a digital receiver residing at a head end and coupled to the upstream aggregator, wherein the digital receiver:

receives the aggregated serial digital data from the upstream aggregator;

converts the aggregated serial digital data to RF data; and outputs the data to the network.

9. The system of claim 8, wherein at least one given burst processor of the plurality of burst processors comprises:

the FIFO memory;

a second quiet code generator; and a digital signal processor (DSP) to measure an RF power level of the serial digital data from a corresponding optical node of the plurality of optical nodes and to select either the FIFO memory or the second quiet code generator based on the RF power level.

10. The system of claim 9, wherein the at least one given burst processor further comprises:

a digital switch coupled to the FIFO memory via a first input port and to the second quiet code generator via a second input port, wherein the DSP outputs a control signal to the digital switch to set the digital switch to the first input port when a valid RF burst in the serial digital data is detected by the DSP and to set the digital switch to the second input port when the valid RF burst is not detected in the serial digital data by the DSP.

11. The system of claim 10, wherein when the digital switch is set to the first input port, the DSP further adjusts a FIFO pointer to point to a location in the FIFO memory where an actual start of the valid RF burst is stored and to account for a start of an RF burst portion that is below a preconfigured detection threshold.

12. The system of claim 8, wherein the aggregation controller further comprises:

a spectrum analyzer coupled to an output port of the digital sample router to receive digitized RF samples from one or more selected input ports of the spectrum analyzer and to analyze the received digitized RF samples according to configured parameters.

* * * * *